US012593037B2

(12) United States Patent
Chen et al.

(10) Patent No.: US 12,593,037 B2
(45) Date of Patent: Mar. 31, 2026

(54) ADAPTIVE REGIONS FOR DECODER-SIDE INTRA MODE DERIVATION AND PREDICTION

(71) Applicant: MEDIATEK INC., Hsinchu City (TW)

(72) Inventors: Hong-Hui Chen, Hsinchu City (TW); Chia-Ming Tsai, Hsinchu City (TW); Chih-Wei Hsu, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 0 days.

(21) Appl. No.: 18/873,512

(22) PCT Filed: May 30, 2023

(86) PCT No.: PCT/CN2023/097019
§ 371 (c)(1),
(2) Date: Dec. 10, 2024

(87) PCT Pub. No.: WO2023/241347
PCT Pub. Date: Dec. 21, 2023

(65) Prior Publication Data

US 2025/0365405 A1      Nov. 27, 2025

Related U.S. Application Data

(60) Provisional application No. 63/369,526, filed on Jul. 27, 2022, provisional application No. 63/351,505, filed on Jun. 13, 2022.

(51) Int. Cl.
*H04N 19/11* (2014.01)
*H04N 19/147* (2014.01)
(Continued)

(52) U.S. Cl.
CPC .......... *H04N 19/11* (2014.11); *H04N 19/147* (2014.11); *H04N 19/176* (2014.11); *H04N 19/593* (2014.11); *H04N 19/70* (2014.11)

(58) Field of Classification Search
CPC .... H04N 19/11; H04N 19/147; H04N 19/176; H04N 19/593; H04N 19/70
(Continued)

(56) References Cited

U.S. PATENT DOCUMENTS 10,440,390 B2    10/2019  Shen
10,567,801 B2     2/2020  Zhao
(Continued)

FOREIGN PATENT DOCUMENTS

CN          105812799 A      7/2016
CN          111869218 A     10/2020
(Continued)

OTHER PUBLICATIONS

International Search Report and Written Opinion dated Aug. 21, 2023, issued in application No. PCT/CN2023/097019.
(Continued)

*Primary Examiner* — Justin W Rider
(74) *Attorney, Agent, or Firm* — McClure, Qualey & Rodack, LLP

(57)                    ABSTRACT

A video coding method using decoder-side intra mode derivation (DIMD) based on multiple histograms of gradients (HoGs) is provided. A video coder receives data to be encoded or decoded as a current block of a current picture of a video. The video coder derives a plurality of HoGs for different intra prediction angles. Different HoGs are derived based on different sets of reconstructed pixels neighboring the current block. The video coder selects a HoG from the plurality of HoGs. The video coder identifies one or more intra prediction modes based on the selected HoG. The video coder generates an intra-prediction of the current block based on the identified one or more intra prediction modes. The video coder encodes or decodes the current block by using the generated intra-prediction.

13 Claims, 14 Drawing Sheets

(51) Int. Cl.

| | | |
|---|---|---|
| *H04N 19/176* | (2014.01) | |
| *H04N 19/593* | (2014.01) | |
| *H04N 19/70* | (2014.01) | |

(58) Field of Classification Search

USPC .................................................... 375/240.12

See application file for complete search history.

(56) References Cited

U.S. PATENT DOCUMENTS

| | | | | |
|---|---|---|---|---|
| 11,930,180 | B2 | 3/2024 | Sim | |
| 11,930,187 | B2 | 3/2024 | Zhao | |
| 12,149,682 | B2 | 11/2024 | Zhao | |
| 2016/0014421 | A1* | 1/2016 | Cote | H04N 19/14 |
| | | | | 382/170 |
| 2017/0353719 | A1 | 12/2017 | Liu | |
| 2018/0165552 | A1* | 6/2018 | Huang | H04N 19/103 |
| 2018/0332284 | A1 | 11/2018 | Liu | |
| 2019/0281290 | A1 | 9/2019 | Lee | |
| 2020/0296356 | A1 | 9/2020 | Mora | |
| 2021/0144368 | A1 | 5/2021 | Chai | |
| 2022/0086428 | A1 | 3/2022 | Lim | |
| 2022/0109846 | A1 | 4/2022 | Lim | |
| 2022/0224894 | A1 | 7/2022 | Zhao | |
| 2022/0417501 | A1* | 12/2022 | Yang | H04N 19/593 |
| 2023/0078392 | A1* | 3/2023 | Li | H04N 19/176 |
| | | | | 375/240.12 |

FOREIGN PATENT DOCUMENTS

| | | | | | |
|---|---|---|---|---|---|
| CN | 113573059 | A | * 10/2021 | .......... | H04N 19/127 |
| CN | 113728632 | A | 11/2021 | | |
| CN | 113767633 | A | 12/2021 | | |
| CN | 114270826 | A | 4/2022 | | |
| EP | 3709644 | A1 | * 9/2020 | .............. | G06N 7/01 |
| WO | 2021244935 | A1 | 12/2021 | | |
| WO | WO-2022256825 | A1 | * 12/2022 | .......... | H04N 19/146 |

OTHER PUBLICATIONS

Abdoli, M.,et al.; "Non-CE3: Decoder-side Intra Mode Derivation with Prediction Fusion;" Joint Video Experts Team (JVET) of ITU-T SG 16 WP 3 and ISO/IEC JTC 1/SC 29/WG 11; Mar. 2019; pp. 1-6.

Abdoli, M., et al.; "Non-CE3: Decoder-side Intra Mode Derivation with Prediction Fusion Using Planar;" Joint Video Experts Team (JVET) of ITU-T SG 16 WP 3 and ISO/IEC JTC 1/SC 29/WG 11; Jul. 2019; pp. 1-10.

International Search Report and Written Opinion dated Jul. 24, 2023, issued in application No. PCT/CN2023/096737.

International Search Report and Written Opinion dated Oct. 7, 2023, issued in application No. PCT/CN2023/107656.

\* cited by examiner

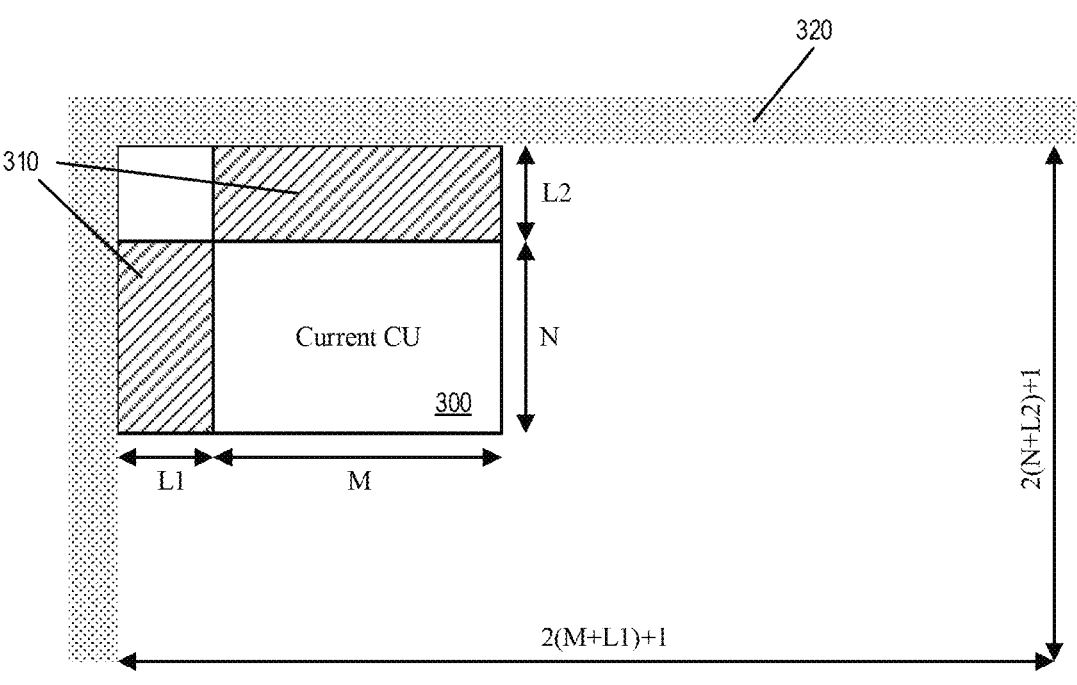
FIG. 3
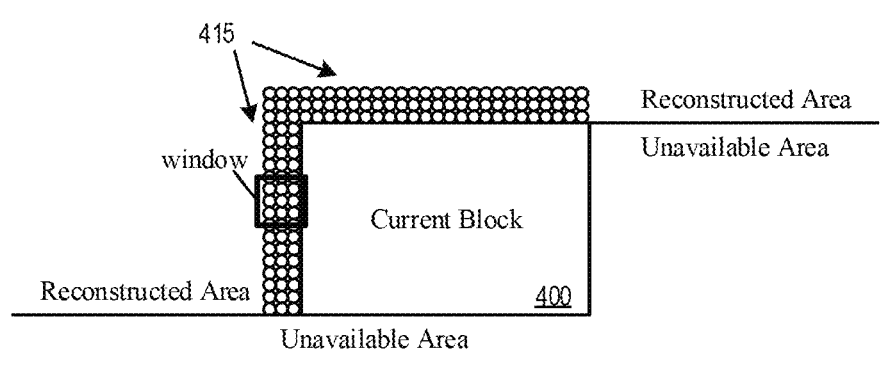
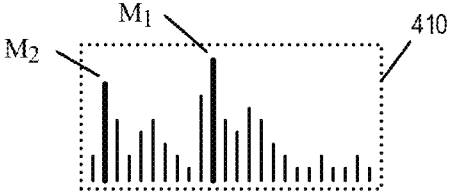
FIG. 4

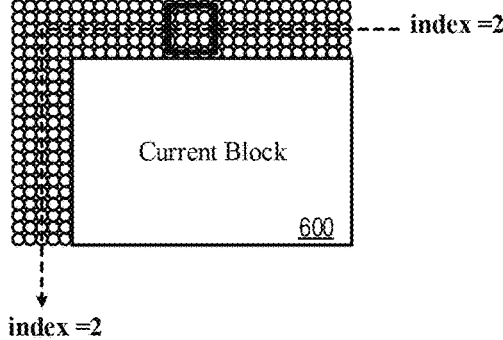
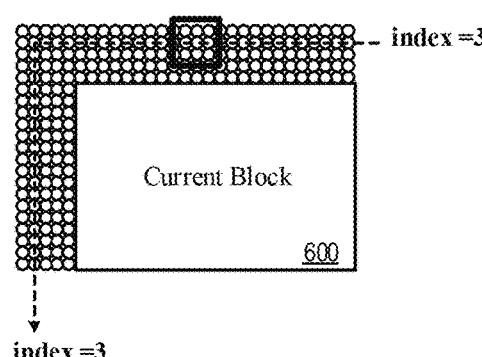
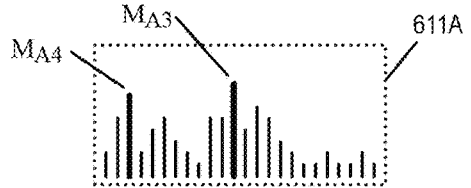
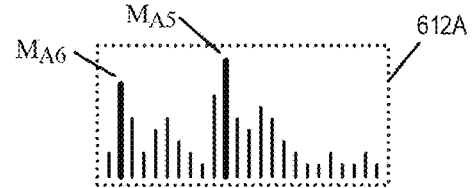
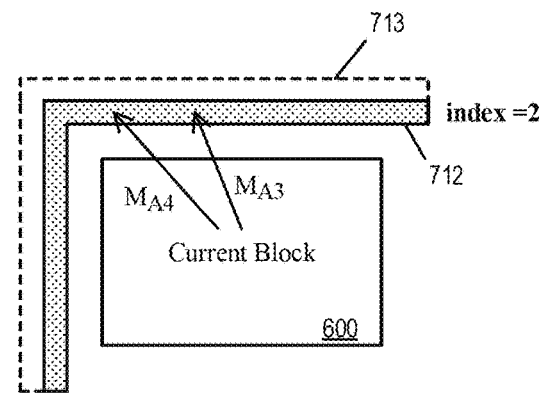
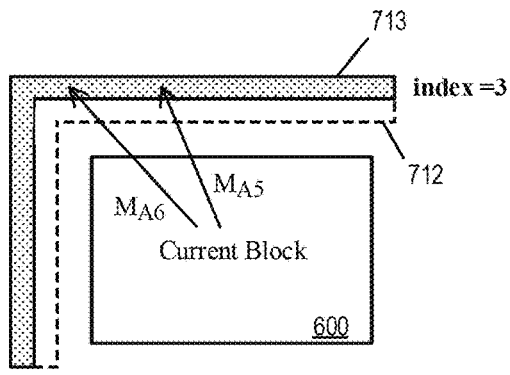
FIG. 7A          FIG. 7B

ADAPTIVE REGIONS FOR DECODER-SIDE INTRA MODE DERIVATION AND PREDICTION

CROSS REFERENCE TO RELATED PATENT APPLICATION(S)

The present disclosure is part of a non-provisional application that claims the priority benefit of U.S. Provisional Patent Application Nos. 63/351,505 and 63/369,526, filed on 13 Jun. 2022 and 27 Jul. 2022, respectively. Contents of above-listed applications are herein incorporated by reference.

TECHNICAL FIELD

The present disclosure relates generally to video coding. In particular, the present disclosure relates to methods of coding pixel blocks by intra mode.

BACKGROUND

Unless otherwise indicated herein, approaches described in this section are not prior art to the claims listed below and are not admitted as prior art by inclusion in this section.

High-Efficiency Video Coding (HEVC) is an international video coding standard developed by the Joint Collaborative Team on Video Coding (JCT-VC). HEVC is based on the hybrid block-based motion-compensated DCT-like transform coding architecture. The basic unit for compression, termed coding unit (CU), is a 2N×2N square block of pixels, and each CU can be recursively split into four smaller CUs until the predefined minimum size is reached. Each CU contains one or multiple prediction units (PUS).

Versatile video coding (VVC) is the latest international video coding standard developed by the Joint Video Expert Team (JVET) of ITU-T SG16 WP3 and ISO/IEC JTC1/SC29/WG11. The input video signal is predicted from the reconstructed signal, which is derived from the coded picture regions. The prediction residual signal is processed by a block transform. The transform coefficients are quantized and entropy coded together with other side information in the bitstream. The reconstructed signal is generated from the prediction signal and the reconstructed residual signal after inverse transform on the de-quantized transform coefficients. The reconstructed signal is further processed by in-loop filtering for removing coding artifacts. The decoded pictures are stored in the frame buffer for predicting the future pictures in the input video signal.

In VVC, a coded picture is partitioned into non-overlapped square block regions represented by the associated coding tree units (CTUs). The leaf nodes of a coding tree correspond to the coding units (CUs). A coded picture can be represented by a collection of slices, each comprising an integer number of CTUs. The individual CTUs in a slice are processed in raster-scan order. A bi-predictive (B) slice may be decoded using intra prediction or inter prediction with at most two motion vectors and reference indices to predict the sample values of each block. A predictive (P) slice is decoded using intra prediction or inter prediction with at most one motion vector and reference index to predict the sample values of each block. An intra (I) slice is decoded using intra prediction only.

A CTU can be partitioned into one or multiple non-overlapped coding units (CUs) using the quadtree (QT) with nested multi-type-tree (MTT) structure to adapt to various local motion and texture characteristics. A CU can be further split into smaller CUs using one of the five split types: quad-tree partitioning, vertical binary tree partitioning, horizontal binary tree partitioning, vertical center-side triple-tree partitioning, horizontal center-side triple-tree partitioning.

Each CU contains one or more prediction units (PUs). The prediction unit, together with the associated CU syntax, works as a basic unit for signaling the predictor information. The specified prediction process is employed to predict the values of the associated pixel samples inside the PU. Each CU may contain one or more transform units (TUs) for representing the prediction residual blocks. A transform unit (TU) is comprised of a transform block (TB) of luma samples and two corresponding transform blocks of chroma samples and each TB correspond to one residual block of samples from one color component. An integer transform is applied to a transform block. The level values of quantized coefficients together with other side information are entropy coded in the bitstream. The terms coding tree block (CTB), coding block (CB), prediction block (PB), and transform block (TB) are defined to specify the 2-D sample array of one color component associated with CTU, CU, PU, and TU, respectively. Thus, a CTU consists of one luma CTB, two chroma CTBs, and associated syntax elements. A similar relationship is valid for CU, PU, and TU.

For each inter-predicted CU, motion parameters consisting of motion vectors, reference picture indices and reference picture list usage index, and additional information are used for inter-predicted sample generation. The motion parameter can be signalled in an explicit or implicit manner. When a CU is coded with skip mode, the CU is associated with one PU and has no significant residual coefficients, no coded motion vector delta or reference picture index. A merge mode is specified whereby the motion parameters for the current CU are obtained from neighbouring CUs, including spatial and temporal candidates, and additional schedules introduced in VVC. The merge mode can be applied to any inter-predicted CU. The alternative to merge mode is the explicit transmission of motion parameters, where motion vector, corresponding reference picture index for each reference picture list and reference picture list usage flag and other needed information are signalled explicitly per each CU.

SUMMARY

The following summary is illustrative only and is not intended to be limiting in any way. That is, the following summary is provided to introduce concepts, highlights, benefits and advantages of the novel and non-obvious techniques described herein. Select and not all implementations are further described below in the detailed description. Thus, the following summary is not intended to identify essential features of the claimed subject matter, nor is it intended for use in determining the scope of the claimed subject matter.

In some embodiments, a first HoG is derived based on reconstructed pixels above the current block, a second HoG derived based on reconstructed pixels left of the current block, and a third HoG derived based on reconstructed pixels left and above the current block. In some embodiments, the plurality of HoGs comprises HoGs that are derived using different numbers of neighboring lines of the current block.

In some embodiments, the selection of the HoG is based on a syntax element signaled in a bitstream. In some embodiments, the encoder identifies one or more intra-prediction modes from a HoG by identifying N candidate intra-prediction modes having the highest amplitudes in the HoG then selecting M intra-prediction modes from the N candidate intra-prediction modes based on costs. In some embodiments, reconstructed pixels at top-left corner of the current block are not used to derive the third HoG.

In some embodiments, the encoder computes costs of the intra-prediction modes that are identified based on the plurality of HoGs and selects the HoG from the plurality of HoGs based on the computed costs. In some embodiments, the cost of an intra-prediction mode is a TM cost computed by comparing a difference between reconstructed samples of a template neighboring the current block and prediction samples of the template generated by the intra-prediction mode using an L-shaped reference region near the template.

In some embodiments, the plurality of HoGs comprises HoGs that are derived based on different neighboring lines of the current block. The different neighboring lines are associated with different HoG generation indices. In some embodiments, if a HoG derived based on neighboring lines associated with a first HoG generation index is used to derive a first intra prediction mode, then an intra-prediction of the current block based on the first intra prediction mode is generated based on a L-shaped reference region that is identified based on the first HoG generation index.

BRIEF DESCRIPTION OF THE DRAWINGS

The accompanying drawings are included to provide a further understanding of the present disclosure, and are incorporated in and constitute a part of the present disclosure. The drawings illustrate implementations of the present disclosure and, together with the description, serve to explain the principles of the present disclosure. It is appreciable that the drawings are not necessarily in scale as some components may be shown to be out of proportion than the size in actual implementation in order to clearly illustrate the concept of the present disclosure.

FIG. 3 illustrates using template-based intra mode derivation (TIMD) to implicitly derive an intra prediction mode for a current block 300.

FIG. 4 illustrates using decoder-side intra mode derivation (DIMD) to implicitly derive an intra prediction mode for a current block.

FIGS. 7A-B illustrate identifying a reference region for generating intra prediction based on the neighboring line that is used to derive the DIMD intra modes for the current block.

DETAILED DESCRIPTION

In the following detailed description, numerous specific details are set forth by way of examples in order to provide a thorough understanding of the relevant teachings. Any variations, derivatives and/or extensions based on teachings described herein are within the protective scope of the present disclosure. In some instances, well-known methods, procedures, components, and/or circuitry pertaining to one or more example implementations disclosed herein may be described at a relatively high level without detail, in order to avoid unnecessarily obscuring aspects of teachings of the present disclosure.

I. Intra Prediction Modes

Intra-prediction method exploits one reference tier adjacent to the current prediction unit (PU) and one of the intra-prediction modes to generate the predictors for the current PU. The Intra-prediction direction can be chosen among a mode set containing multiple prediction directions. For each PU coded by Intra-prediction, one index will be used and encoded to select one of the intra-prediction modes. The corresponding prediction will be generated and then the residuals can be derived and transformed.

Figure 1:
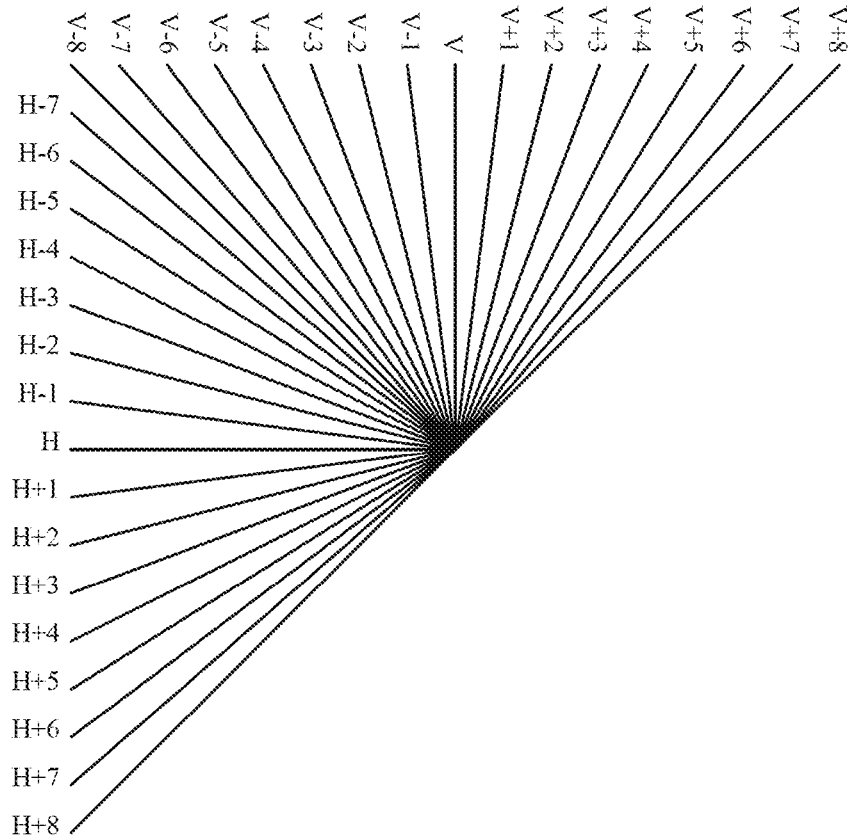
FIG. 1 shows the intra-prediction modes in different directions.

FIG. 1 shows the intra-prediction modes in different directions. These intra-prediction modes are referred to as directional modes and do not include DC mode or Planar mode. As illustrated, there are 33 directional modes (V: vertical direction; H: horizontal direction), so H, H+1~H+8, H−1~H−7, V, V+1~V+8, V−1~V−8 are used. Generally directional modes can be represented as either as H+k or V+k modes, where k=±1, ±2, . . . , ±8. Each of such intra-prediction mode can also be referred to as an intra-prediction angle. To capture arbitrary edge directions presented in natural video, the number of directional intra modes may be extended from 33, as used in HEVC, to 65 direction modes so that the range of k is from ±1 to ±16. These denser directional intra prediction modes apply for all block sizes and for both luma and chroma intra predictions. By including DC and Planar modes, the number of intra-prediction mode is 35 (or 67).

Out of the 35 (or 67) intra-prediction modes, some modes (e.g., 3 or 5) are identified as a set of most probable modes (MPM) for intra-prediction in the current prediction block. The encoder may reduce bit rate by signaling an index to select one of the MPMs instead of an index to select one of the 35 (or 67) intra-prediction modes. For example, the intra-prediction mode used in the left prediction block and the intra-prediction mode used in the above prediction block are used as MPMs. When the intra-prediction modes in two neighboring blocks use the same intra-prediction mode, the intra-prediction mode can be used as an MPM. When only one of the two neighboring blocks is available and coded in directional mode, the two neighboring directions immediately next to this directional mode can be used as MPMs. DC mode and Planar mode are also considered as MPMs to fill the available spots in the MPM set, especially if the above or top neighboring blocks are not available or not coded in intra-prediction, or if the intra-prediction modes in neighboring blocks are not directional modes. If the intra-prediction mode for current prediction block is one of the modes in the MPM set, 1 or 2 bits are used to signal which one it is. Otherwise, the intra-prediction mode of the current block is not the same as any entry in the MPM set, and the current block will be coded as a non-MPM mode. There are all-together 32 such non-MPM modes and a (5-bit) fixed length coding method is applied to signal this mode.

The MPM list is constructed based on intra modes of the left and above neighboring block. Suppose the mode of the left neighboring block is denoted as Left and the mode of the above neighboring block is denoted as Above, and the unified MPM list may be constructed as follows:

When a neighboring block is not available, its intra mode is set to Planar by default.

If both modes Left and Above are non-angular modes: MPM list→{Planar, DC, V, H, V−4, V+4}

If one of modes Left and Above is angular mode, and the other is non-angular:
Set a mode Max as the larger mode in Left and Above
MPM list→{Planar, Max, Max−1, Max+1, Max−2, Max+2}

If Left and Above are both angular and they are different:
Set a mode Max as the larger mode in Left and Above
Set a mode Min as the smaller mode in Left and Above
If Max-Min is equal to 1:
MPM list→{Planar, Left, Above, Min−1, Max+1, Min−2}

Otherwise, if Max-Min is greater than or equal to 62:
MPM list→{Planar, Left, Above, Min+1, Max−1, Min+2}

Otherwise, if Max−Min is equal to 2:
MPM list→{Planar, Left, Above, Min+1, Min−1, Max+1}

Otherwise:
MPM list→{Planar, Left, Above, Min−1, Min+1, Max−1}

If Left and Above are both angular and they are the same:
MPM list→{Planar, Left, Left−1, Left+1, Left−2, Left+2}

Conventional angular intra prediction directions are defined from 45 degrees to −135 degrees in clockwise direction. In VVC, several conventional angular intra prediction modes are adaptively replaced with wide-angle intra prediction modes for non-square blocks. The replaced modes are signalled using the original mode indices, which are remapped to indices of wide angular modes after parsing.

Figure 2A:
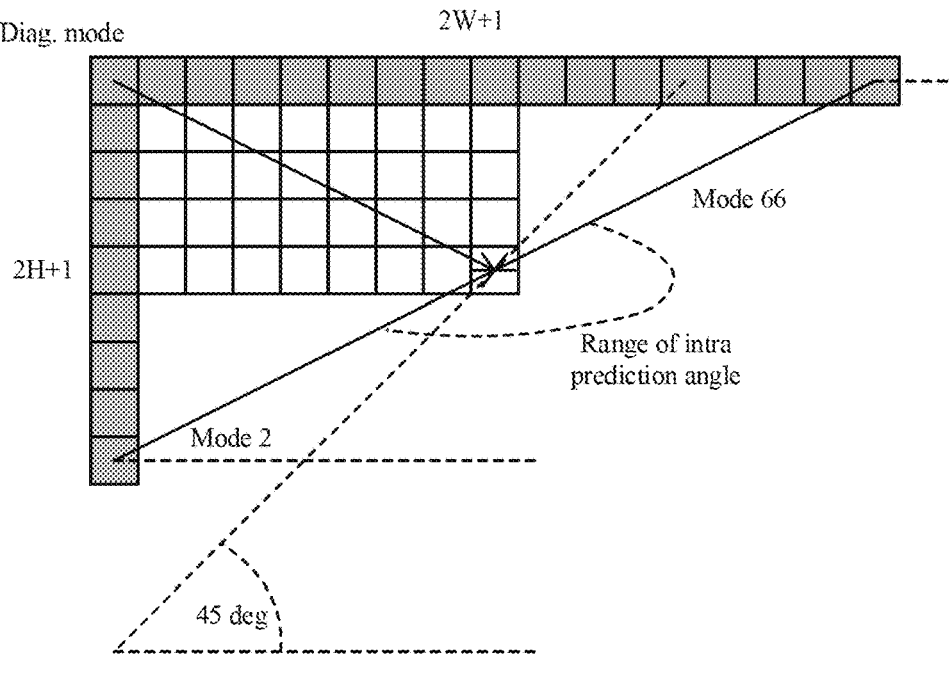
FIGS. 2A-B conceptually illustrate top and left reference templates with extended lengths for supporting wide-angular direction mode for non-square blocks of different aspect ratios.
Figure 2B:
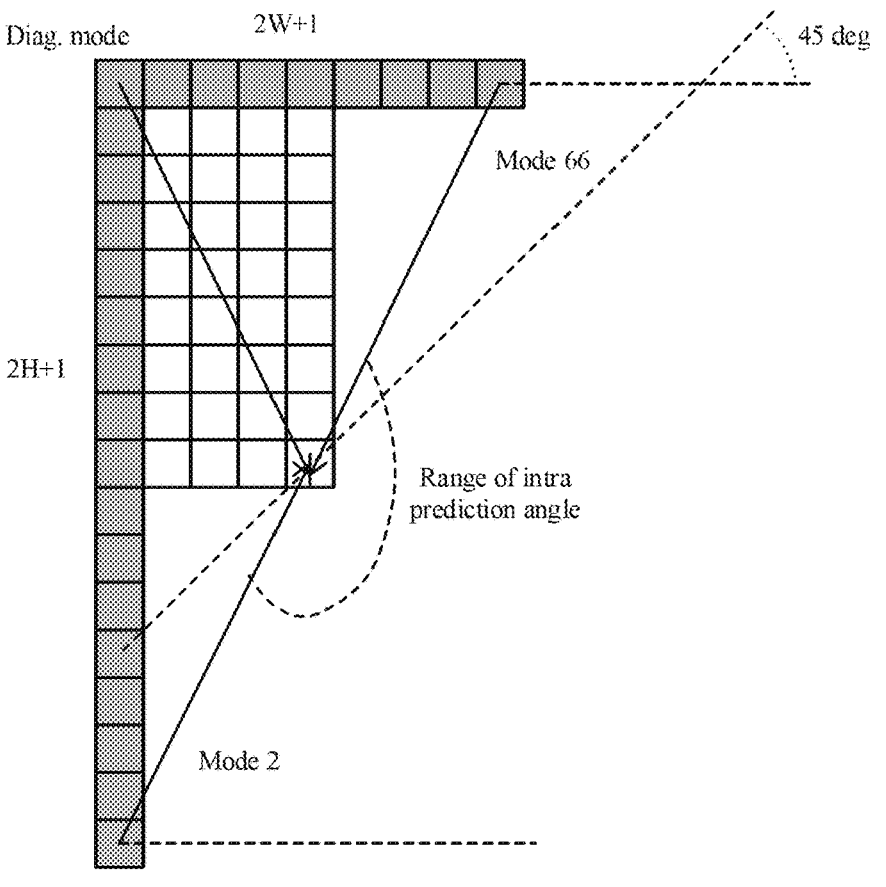

For some embodiments, the total number of intra prediction modes is unchanged, i.e., 67, and the intra mode coding method is unchanged. To support these prediction directions, a top reference template with length 2 W+1 and a left reference template with length 2H+1 are defined. FIGS. 2A-B conceptually illustrate top and left reference templates with extended lengths for supporting wide-angular direction mode for non-square blocks of different aspect ratios.

The number of replaced modes in wide-angular direction mode depends on the aspect ratio of a block. The replaced intra prediction modes for different blocks of different aspect ratios are shown in Table 1 below.

TABLE 1

Intra prediction modes replaced by wide-angular modes

| Aspect ratio | Replaced intra prediction modes |
|---|---|
| W/H = 16 | Modes 2, 3, 4, 5, 6, 7, 8, 9, 10, 11, 12, 13, 14, 15 |
| W/H = 8 | Modes 2, 3, 4, 5, 6, 7, 8, 9, 10, 11, 12, 13 |

TABLE 1-continued

Intra prediction modes replaced by wide-angular modes

| Aspect ratio | Replaced intra prediction modes |
|---|---|
| W/H = 4 | Modes 2, 3, 4, 5, 6, 7, 8, 9, 10, 11 |
| W/H = 2 | Modes 2, 3, 4, 5, 6, 7, 8, 9 |
| W/H = 1 | None |
| W/H = ½ | Modes 59, 60, 61, 62, 63, 64, 65, 66 |
| W/H = ¼ | Modes 57, 58, 59, 60, 61, 62, 63, 64, 65, 66 |
| W/H = ⅛ | Modes 55, 56, 57, 58, 59, 60, 61, 62, 63, 64, 65, 66 |
| W/H = 1/16 | Modes 53, 54, 55, 56, 57, 58, 59, 60, 61, 62, 63, 64, 65, 66 |

II. Template-Based Intra Mode Derivation (TIMD)

For mode selection, template matching method can be applied by computing the cost between reconstructed samples and predicting samples. One of the examples is template-based intra mode derivation (TIMD). TIMD is a coding method in which the intra prediction mode of a CU is implicitly derived by using a neighboring template at both encoder and decoder, instead of the encoder signaling the exact intra prediction mode to the decoder.

FIG. 3 illustrates using template-based intra mode derivation (TIMD) to implicitly derive an intra prediction mode for a current block 300. As illustrated, the neighboring pixels of the current block 300 is used as template 310. For each candidate intra mode, prediction samples of the template 310 are generated using the reference samples, which are in a L-shape reference region 320 above and left of the template 310. A TM cost for a candidate intra mode cost is calculated based on a difference (e.g., SATD) between reconstructed samples of the template and the prediction samples of the template generated by the candidate intra mode. The candidate intra prediction mode with the minimum cost is selected (as in the DIMD mode) and used for intra prediction of the CU. The candidate modes may include 67 intra prediction modes (as in VVC) or extended to 131 intra prediction modes. MPMs may be used to indicate the directional information of a CU. Thus, to reduce the intra mode search space and utilize the characteristics of a CU, the intra prediction mode is implicitly derived from the MPM list.

In some embodiments, for each intra prediction mode in the MPM list, the SATD between the prediction and reconstructed samples of the template is calculated as the TM cost of the intra mode. First two intra prediction modes with the minimum SATD are selected as the TIMD modes. These two TIMD modes are fused with the weights after applying PDPC process, and such weighted intra prediction is used to code the current CU. Position dependent intra prediction combination (PDPC) is included in the derivation of the TIMD modes.

The costs of two selected modes (mode1 and mode2) are compared with a threshold, in the test the cost factor of 2 is applied as follows:

$$costMode2 < 2 * costMode1$$

If this condition is true, the prediction fusion is applied, otherwise only mode1 is used. Weights of the modes are computed from their SATD costs as follows:

$$weight1 = costMode2/(costMode1 + costMode2)$$

$$weight2 = 1 - weight1$$

III. Decoder Side Intra Mode Derivation (DIMD)

Decoder-Side Intra Mode Derivation (DIMD) is a technique in which two intra prediction modes/angles/directions are derived from the reconstructed neighbor samples (template) of a block, and those two predictors are combined with the planar mode predictor with the weights derived from the gradients. The DIMD mode is used as an alternative prediction mode and is always checked in high-complexity RDO mode. To implicitly derive the intra prediction modes of a blocks, a texture gradient analysis is performed at both encoder and decoder sides. This process starts with an empty Histogram of Gradient (HoG) having 65 entries, corresponding to the 65 angular/directional intra prediction modes. Amplitudes of these entries are determined during the texture gradient analysis.

A video coder performing DIMD performs the following steps: in a first step, the video coder picks a template of T=3 columns and lines from respectively left and above current block. This area is used as the reference for the gradient based intra prediction modes derivation. In a second step, the horizontal and vertical Sobel filters are applied on all 3×3 window positions, centered on the pixels of the middle line of the template. On each window position, Sobel filters calculate the intensity of pure horizontal and vertical directions as $G_x$ and $G_y$, respectively. Then, the texture angle of the window is calculated as:

$$angle = \arctan(G_x/G_y),$$

which can be converted into one of the 65 angular intra prediction modes. Once the intra prediction modes index of current window is derived as idx, the amplitude of its entry in the HoG[idx] is updated by addition of $$ampl = |G_x| + |G_y|$$

FIG. 4 illustrates using decoder-side intra mode derivation (DIMD) to implicitly derive an intra prediction mode for a current block. The figure shows an example Histogram of Gradient (HoG) 410 that is calculated after applying the above operations on all pixel positions in a template 415 that includes neighboring lines of pixel samples around a current block 400. Once the HoG is computed, the indices of the two tallest histogram bars ($M_1$ and $M_2$) are selected as the two implicitly derived intra prediction modes (IPMs) for the block. The prediction of the two IPMs are further combined with the planar mode as the prediction of DIMD mode. The prediction fusion is applied as a weighted average of the above three predictors ($M_1$ prediction, $M_2$ prediction, and planar mode prediction). To this aim, the weight of planar may be set to 21/64 (~⅓). The remaining weight of 43/64 (~⅔) is then shared between the two HoG IPMs, proportionally to the amplitude of their HoG bars. The prediction fusion or combined prediction for DIMD can be:

$$Pred_{DIMD} = \left(43 * (w1 * pred_{M1} + w2 * pred_{M2}) + 21 * pred_{planar}\right) >> 6$$

$$w1 = amp_{M1}/(amp_{M1} + amp_{M2})$$

$$w2 = amp_{M2}/(amp_{M1} + amp_{M2})$$

In addition, the two implicitly derived intra prediction modes are added into the most probable modes (MPM) list, so the DIMD process is performed before the MPM list is constructed. The primary derived intra mode of a DIMD block is stored with a block and is used for MPM list construction of the neighboring blocks.

IV. DIMD with Multiple HoGs

Some embodiments of the disclosure provide a method for improving the DIMD prediction accuracy or coding performance. In some embodiments, to reduce computations, the HoG computation is based on from partially selected neighboring window positions. For some embodiments, the video coder may choose the above-middle, above-right, left-middle, left-bottom neighboring window positions to apply Sobel filters to build the HoG. The video coder may also choose even or odd neighboring window positions to apply Sobel filters to build the HoG.

In some embodiments, when encoding the video, three HoGs are built including: left side HoG, above side HoG, and the original left-above side HoG. From each of these HoGs, the two or more DIMD intra modes (e.g., $M_1$ and $M_2$ of FIG. 4) are derived. To decide the final DIMD modes, a cost evaluation process (e.g., a high-complexity RDO process) is applied to each of the two or more DIMD modes derived from each of the three HoGs. In some embodiments, extra syntax elements are added in the bitstream to indicate which side (left/above/left-above) is used for the HoG accumulation to derive the DIMD intra modes.

Figures 5A, 5B, 5C:
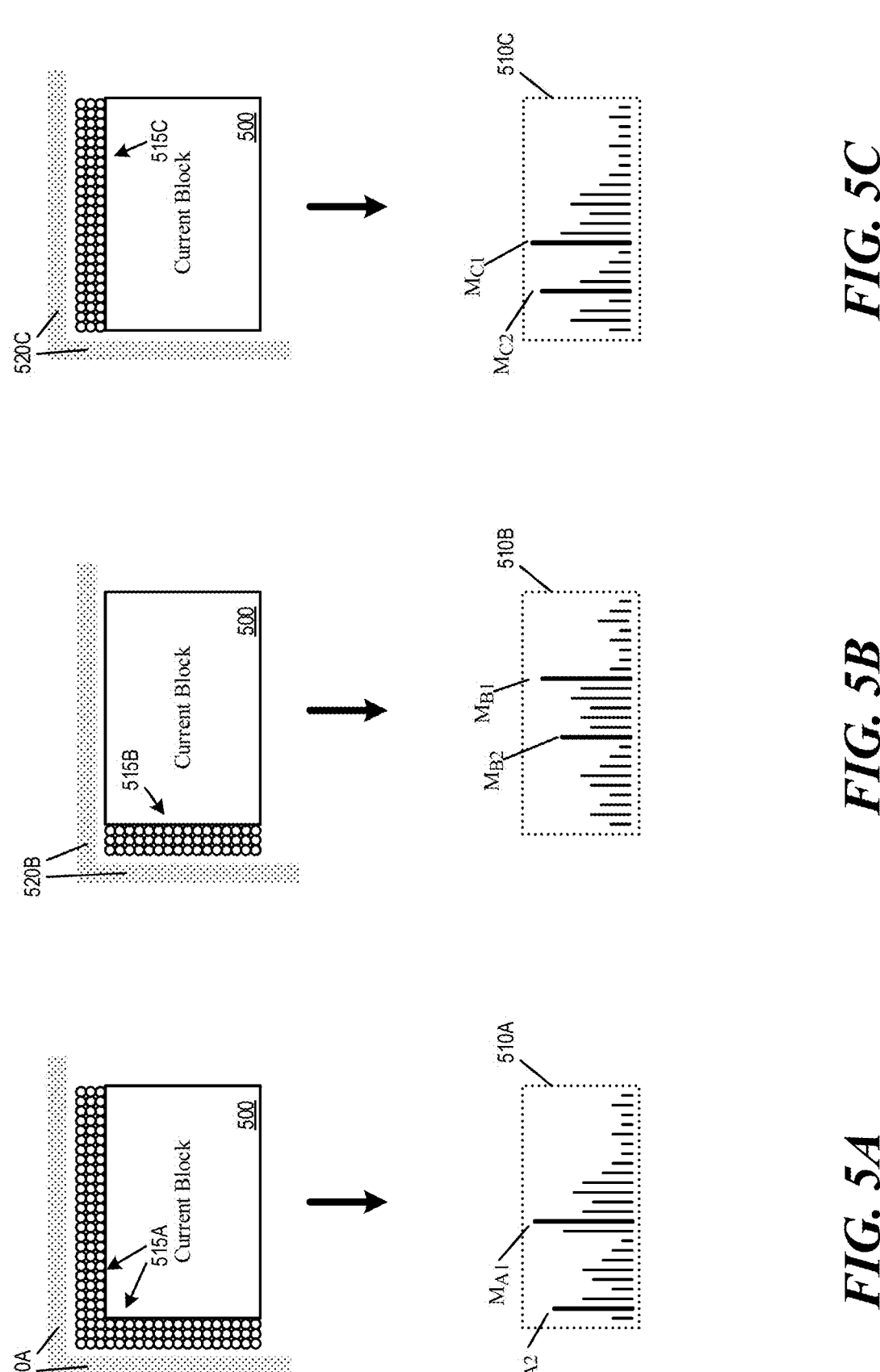
FIGS. 5A-C conceptually illustrate DIMD intra modes derived from multiple different histograms of gradients (HoGs) for a current block.

FIGS. 5A-C conceptually illustrate DIMD intra modes derived from multiple different HoGs for a current block 500. FIG. 5A illustrates a HoG 510A that is accumulated based on template regions 515A. The pixel samples of template region 515A include neighboring lines of the current block at its top side and its left side. (Thus, the HoG 510A is a left-above side HoG.) Two intra modes $M_{A1}$ and $M_{A2}$ are identified based on the two tallest accumulated amplitudes of the HoG 510A.

FIG. 5B illustrates a HoG 510B that is accumulated based on template regions 515B. The pixel samples of template region 515B consists of neighboring lines of the current block at its left side. (Thus, the HoG 510B is a left side HoG.) Two intra modes $M_{B1}$ and $M_{B2}$ are identified based on the two tallest accumulated amplitudes of the HoG 510B.

FIG. 5C illustrates a HoG 510C that is accumulated based on template regions 515C. The pixel samples of template region 515C consists of neighboring lines of the current block at its top side. (Thus, the HoG 510C is an above side HoG.) Two intra modes $M_{C1}$ and $M_{C2}$ are identified based on the two tallest accumulated amplitudes of the HoG 510C.

In some embodiments, to determine the final DIMD intra modes, template matching (TM) costs of the DIMD intra modes derived by the three HoGs can be used to select one of the three (left/above/left-above) HoGs to derive the final DIMD intra modes. (The TM cost of an intra mode is described in Section II above.) In the example of FIG. 5A-C, the video coder may select the one of the three HoGs 510A-C based on the TM costs computed for the DIMD intra modes $M_{A1}$, $M_{A2}$, $M_{B1}$, $M_{B2}$, $M_{C1}$, $M_{C2}$. (The TM costs are computed based on L-shape reference region 520A, 520B, and 520C that neighbors the template regions 515A, 515B, and 515C, respectively.)

For example, in some embodiments, the TM costs of the first DIMD intra modes of the three HoGs (e.g., intra direction with the highest accumulation, $M_{A1}$, $M_{B1}$, $M_{C1}$ for HoGs 510A-C, respectively) are evaluated and compared. The HoG whose first DIMD intra mode has the lowest TM cost among the three HoGs is selected to provide the final DIMD intra modes for the current block. (Thus, if $M_{B1}$ has the lowest cost, HoG 510B is selected). Other cost evaluation such as the TM cost of the first DIMD intra mode plus the TM cost of the second DIMD intra mode, or a weighted sum of the two TM costs, of each HoG, can be used to select one of the three HoGs.

In some embodiments, with above mentioned explicit HoG side or implicit HoG side selection, HoGs of different sides are constrained to different sets of selectable intra modes. Table 2 below shows one of the possible implementations.

TABLE 2

| DIMD HoG side | Selectable intra modes |
|---|---|
| Left + Above | 2, 3, 4, 5, . . . , 64, 65, 66 |
| Left | 2, 3, 4, 5, . . . , 33, 34, 35 |
| Above | 33, 34, 35, . . . , 64, 65, 66 |

With the mode selection constraint, higher chances that the DIMD intra modes derived from the left side HoG are different from the DIMD intra modes derived from the above side HoG. In Table 2, there are some overlap between the selectable modes of the left side and the selectable modes of the above side (modes 33, 34, 35). Therefore, there is still opportunity for the left HoG and the above HoG to derive the same DIMD intra modes.

In some embodiments, Table 3 is used and the intra modes derived from the left side and from the above sides are distinct (no overlap).

TABLE 3

| DIMD HoG side | Selectable intra modes |
|---|---|
| Left + Above | 2, 3, 4, 5, . . . , 64, 65, 66 |
| Left | 2, 3, 4, 5, . . . , 32, 33, 34 |
| Above | 35, 36, 37, . . . , 64, 65, 66 |

To decide which table (Table 2 or Table 3) to use, the video coder in some embodiments may compress a video database to check the coding gain and select a predefined table for coding. In some embodiments, a set of possible tables are defined and the video coder may signal syntax elements to select the best table for coding.

In some embodiments, with above mentioned explicit or implicit HoG side selection, the selectable intra/DIMD modes related to the three DIMD HoG sides are entirely distinct (no overlap). Table 4 shows an implementation for the 131 angular modes domain in which the intra modes of the different HoGs have no overlap:

TABLE 4

| DIMD HoG side | Selectable intra modes in 131 angular modes domain |
|---|---|
| Left | 2, 6, 10, 14, 18, 22, . . . , 130 |
| Above | 4, 8, 12, 16, 20, 24, . . . , 128 |
| Left + Above | 3, 5, 7, 9, 11, 13, . . . , 131 |

In Table 4, the DIMD process is applied in the 131 intra angular mode domain, a left side HoG provides the two intra modes from (4×i+2) intra modes, where i=0 . . . 32, a right side HoG provides the two intra modes from (4×j+4) intra modes, wherein j=0 . . . 32, and a left-above HOG provides the two intra modes from (2×k+3) intra modes, where k=0 . . . 64. Table 5 shows an implementation for the 67 angular modes domain in which the intra/DIMD modes of the different HoGs have no overlap:

TABLE 5

| DIMD HoG side | Selectable intra modes in 67 angular modes domain |
|---|---|
| Left | 2, 6, 10, 14, 18, 22, . . . , 66 |
| Above | 4, 8, 12, 16, 20, 24, . . . , 64 |
| Left + Above | 3, 5, 7, 9, 11, 13, . . . , 65 |

In Table 5, assume the DIMD process is applied in the 67 intra angular mode domain, left side HoG provides the two intra modes from (4×i+2) intra modes, where i=0 . . . 16, right side HoG provides the two intra modes from (4×j+4) intra modes, wherein j=0 . . . 16, and left-above HoG provides the two intra modes from (2×k+3) intra modes, where k=0 . . . 63.

Figures 6A, 6B, 6C:
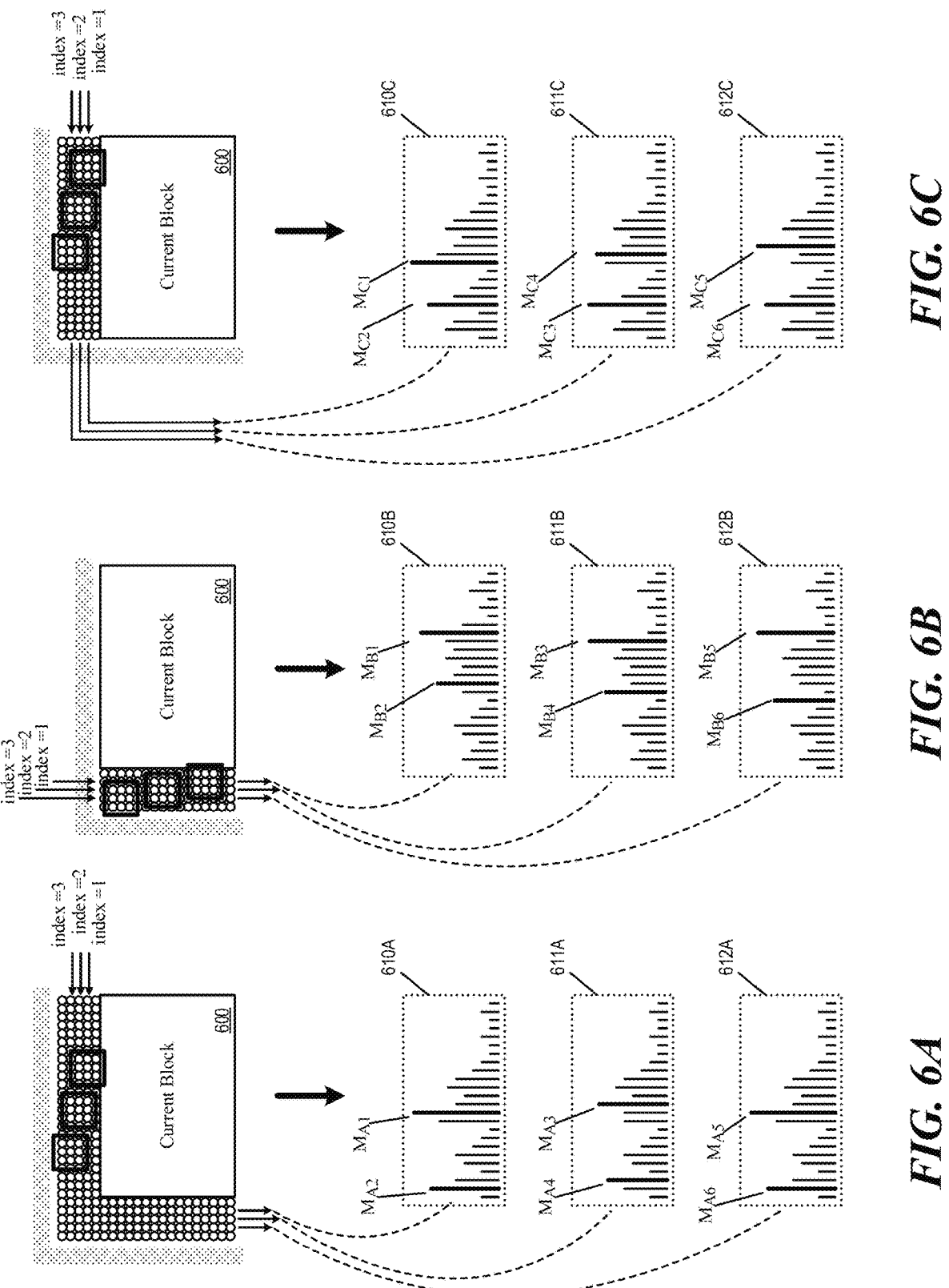
FIG. 6A-C illustrates the DIMD process for when there are additional neighboring lines for some embodiments.

In some embodiments, the number of neighboring lines used to compute HoG in the DIMD process may be signaled in PPS, SPS, picture header, slice header, CTU-level syntax, or implicitly derived depending on other syntax. For example, the DIMD process may use more neighboring lines (i.e., more than 3 lines) to compute the HoG(s) when the current block size is less than or greater than a threshold. FIG. 6A-C illustrates the DIMD process for when there are additional neighboring lines for some embodiments.

As illustrated, the original 3×3 Sobel filter is applied to the additional neighboring lines to generate additional HoGs, such that there are multiple left side HoGs 610A-612A, multiple above side HoGs 610B-612B, and multiple left-above side HoGs 610C-612C (so nine HoGs in total). Each HoG corresponds to one sweep of the Sobel window at different distances from the current block. In some embodiments, each of the multiple neighboring lines of the current block is assigned a HoG generation index, for example, the neighboring line that is immediately adjacent to the current block is assigned HoG generation index 0, while the next closest neighboring line to the current block is assigned HoG generation index 1, etc. In the example, HoGs 610A, 610B, 610C correspond to a Sobel sweep that centers on neighboring line 1 (HoG generation index 1), HoGs 611A, 611B, 611C correspond to a Sobel sweep that centers on neighboring line 2 (HoG generation index 2), HoGs 612A, 612B, 612C correspond to a Sobel sweep that centers on neighboring line 3 (HoG generation index 3).

Each of the HoGs is used to identify two (or more) DIMD intra modes. TM cost process described in Section II is used to determine the costs of these DIMD intra modes. The video coder may select one of the nine HoGs as the basis to produce the final DIMD intra mode. For example, if HoG 611B has the lowest cost, then the final DIMD intra modes are selected from the HoG 611B (HoG generation index 2) from the current block is chosen.

In some other embodiments, a larger window (and a Sobel filter with a larger kernel) may be used to accumulate the HoGs, such that the selection of the HoG to provide the final (e.g., two) DIMD intra modes is still from one of the three HoGs (left/above/left-above).

For some embodiments, DIMD HoG accumulation and intra prediction generation process is orthogonal. DIMD HoG accumulation can be performed based on the nearest L-shape reference region or neighboring line of the current block, while intra prediction generation can refer to multiple L-shape reference regions or neighboring lines. In some embodiments, multiple L-shape regions may be applied to both DIMD HoG accumulation and intra prediction generation, such that the HoG generation index (or indices) of the L shape(s) can be carried from the DIMD HoG accumulation process to the intra prediction generation process. Furthermore, the generated prediction corresponding to the selected HoG generation index (or indices) of the L shape(s) can be reused in the intra-prediction generation process. The shared computation between the two processes (DIMD HoG and intra prediction) can be reused to reduce the computing load. More generally, the neighboring line or reference region used for generating the intra prediction pixels of the current block (for TM cost of individual candidate intra modes or for final intra prediction of the current block) can be identified based on the HoG generation index of the neighboring line through which the DIMD HoG is accumulated and the DIMD intra modes are identified.

FIGS. 7A-B illustrate identifying a reference region for generating intra prediction based on the neighboring line that is used to derive the DIMD intra modes for the current block 600. FIG. 7A illustrates the HoG 611A being generated by Sobel sweep with HoG generation index 2. The HoG 611A is used to identify two DIMD intra modes $M_{43}$ and $M_{44}$. Intra prediction pixels based on intra modes $M_{43}$ and $M_{44}$ (for TM cost and/or for final intra-prediction) are generated based on a L-shape region 712 that is identified based on the HoG generation index of 2.

FIG. 7B illustrates the HoG 612A being generated by Sobel sweep with HoG generation index 3. The HoG 612A is used to identify two DIMD intra modes $M_{45}$ and $M_{46}$. Intra prediction pixels based on intra modes $M_{45}$ and $M_{46}$ (for TM cost and/or for final intra-prediction) are generated based on a L-shape region 713 that is identified based on the HoG generation index of 3, which is farther away from the current block 600 than the L-shape region 712 identified based on the HoG generation index 2.

Figure 8A:
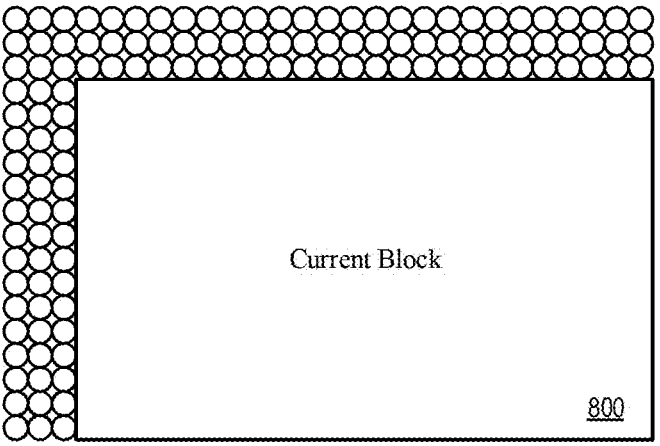
FIGS. 8A-B illustrate eliminating positions at top-left corner from HoG accumulation.
Figure 8B:
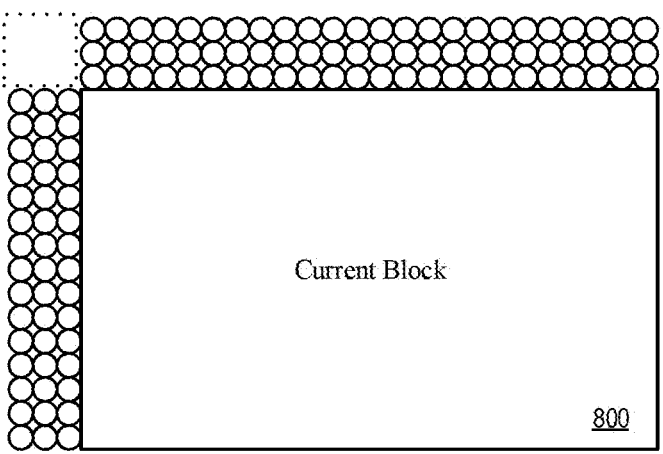

In some embodiments, for reducing the computation of HoG, the gradients from the top-left corner positions are eliminated from HoG accumulation. FIGS. 8A-B illustrate eliminating positions at top-left corner from HoG accumulation. For a current block 800, FIG. 8A illustrates positions that are used for left-above side HoG when no positions are eliminated FIG. 8B illustrates positions that are used for left-above side HoG when top-left corner positions are eliminated from HoG accumulation. In some embodiments, these positions are always eliminated from HoG accumulation. In some embodiments, the elimination of these position from HoG accumulation is based on certain determination based on block size. For example, if the current block width plus current block height or the current block area is greater than a predefined threshold, the gradients from these corner positions are discarded, that is, only the gradients from above-side and left-side are included in HoG computation.

In some embodiments, when DIMD is used for the current block, two intra modes with the highest gradient values are determined from the reconstructed neighboring samples, and the predictions of these two intra modes are further combined with the planar mode predictor (as a weighted sum) to produce the final intra predictor. When deciding the first two intra modes, the video coder may compare the gradient of each intra mode (as a current candidate intra mode) with the current best and the second best intra modes (in terms of having the highest gradient values). If the gradient of the current candidate intra mode is the same as the current best and/or the second best intra modes, the video coder may further compare the TIMD cost of the current intra prediction mode with the TIMD cost of the current best and/or the second best intra modes. Specifically, if the current candidate intra mode has the same gradient magnitude as the current best and/or the second best intra modes, the template cost of the candidate intra modes is calculated as the SATD between the prediction and the reconstruction samples of the template. If the current candidate intra mode has a lower template cost than that of the current best and/or the second best intra modes, the current candidate intra mode is selected as the current best or the second best intra mode.

In some embodiments, after a DIMD HoG is built, K candidate intra modes with highest gradient values are selected, and the TM process is applied to these K candidate intra modes to decide the final intra modes as the DIMD intra modes. Specifically, TM costs (as described by Section II) are calculated for these K candidate intra modes that have the highest gradient values. If the number of candidate intra modes with non-zero amplitude is less than K, the video coder would calculate TM costs for only the candidate intra modes with non-zero amplitudes.

In some embodiments, the DIMD process as described above can be used as a first pass selection to generate the two angular mode candidates with highest and second highest gradient values. The TM process is then applied as a second pass selection to refine the intra modes selected in the first pass. In some embodiments, if the two intra modes selected by the DIMD process in the first pass are M and N, TM is applied to the intra modes {M−1, M, M+1}, and {N−1, N, N+1} for refining the two intra modes of DIMD. However, the two refined DIMD intra modes may be the same. In that case, in order to have two different DIMD intra modes, a predefined rule can be applied to select a second intra mode. For example, the video coder may select the second mode from the list {M, N, M−1, M+1, N−1, N+1} that is different than the refined single DIMD intra mode.

V. Example Video Encoder

Figure 9:
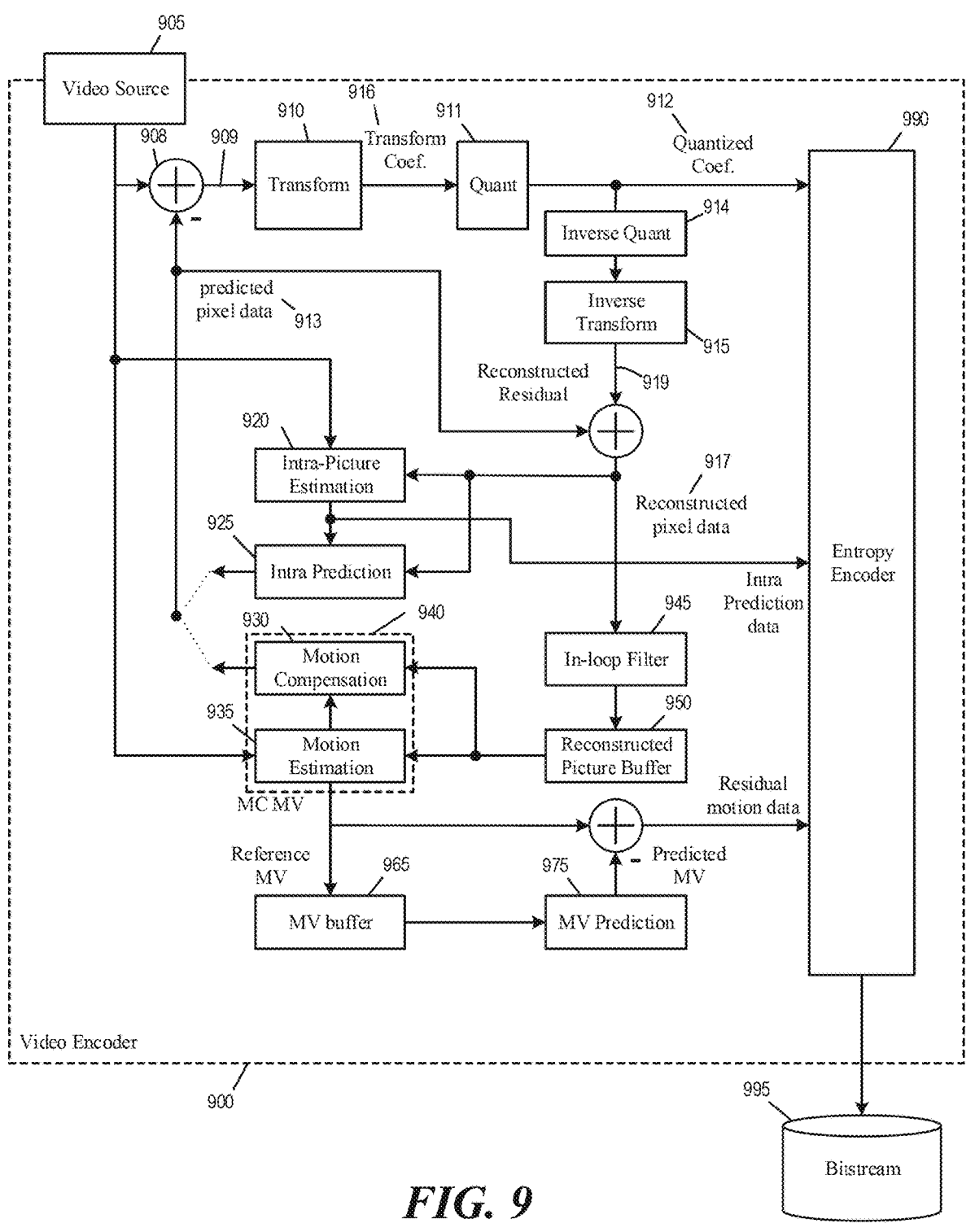
FIG. 9 illustrates an example video encoder that may implement DIMD intra prediction.

FIG. 9 illustrates an example video encoder 900 that may implement decoder-side intra mode derivation (DIMD). As illustrated, the video encoder 900 receives input video signal from a video source 905 and encodes the signal into bitstream 995. The video encoder 900 has several components or modules for encoding the signal from the video source 905, at least including some components selected from a transform module 910, a quantization module 911, an inverse quantization module 914, an inverse transform module 915, an intra-picture estimation module 920, an intra-prediction module 925, a motion compensation module 930, a motion estimation module 935, an in-loop filter 945, a reconstructed picture buffer 950, a MV buffer 965, and a MV prediction module 975, and an entropy encoder 990. The motion compensation module 930 and the motion estimation module 935 are part of an inter-prediction module 940.

In some embodiments, the modules 910-990 are modules of software instructions being executed by one or more processing units (e.g., a processor) of a computing device or electronic apparatus. In some embodiments, the modules 910-990 are modules of hardware circuits implemented by one or more integrated circuits (ICs) of an electronic apparatus. Though the modules 910-990 are illustrated as being separate modules, some of the modules can be combined into a single module.

The video source 905 provides a raw video signal that presents pixel data of each video frame without compression. A subtractor 908 computes the difference between the raw video pixel data of the video source 905 and the predicted pixel data 913 from the motion compensation module 930 or intra-prediction module 925 as prediction residual 909. The transform module 910 converts the difference (or the residual pixel data or residual signal 908) into transform coefficients (e.g., by performing Discrete Cosine Transform, or DCT). The quantization module 911 quantizes the transform coefficients into quantized data (or quantized coefficients) 912, which is encoded into the bitstream 995 by the entropy encoder 990.

The inverse quantization module 914 de-quantizes the quantized data (or quantized coefficients) 912 to obtain transform coefficients, and the inverse transform module 915 performs inverse transform on the transform coefficients to produce reconstructed residual 919. The reconstructed residual 919 is added with the predicted pixel data 913 to produce reconstructed pixel data 917. In some embodiments, the reconstructed pixel data 917 is temporarily stored in a line buffer (not illustrated) for intra-picture prediction and spatial MV prediction. The reconstructed pixels are filtered by the in-loop filter 945 and stored in the reconstructed picture buffer 950. In some embodiments, the reconstructed picture buffer 950 is a storage external to the video encoder 900. In some embodiments, the reconstructed picture buffer 950 is a storage internal to the video encoder 900.

The intra-picture estimation module 920 performs intra-prediction based on the reconstructed pixel data 917 to produce intra prediction data. The intra-prediction data is provided to the entropy encoder 990 to be encoded into bitstream 995. The intra-prediction data is also used by the intra-prediction module 925 to produce the predicted pixel data 913.

The motion estimation module 935 performs inter-prediction by producing MVs to reference pixel data of previously decoded frames stored in the reconstructed picture buffer 950. These MVs are provided to the motion compensation module 930 to produce predicted pixel data.

Instead of encoding the complete actual MVs in the bitstream, the video encoder 900 uses MV prediction to generate predicted MVs, and the difference between the MVs used for motion compensation and the predicted MVs is encoded as residual motion data and stored in the bitstream 995.

The MV prediction module 975 generates the predicted MVs based on reference MVs that were generated for encoding previously video frames, i.e., the motion compensation MVs that were used to perform motion compensation. The MV prediction module 975 retrieves reference MVs from previous video frames from the MV buffer 965. The video encoder 900 stores the MVs generated for the current video frame in the MV buffer 965 as reference MVs for generating predicted MVs.

The MV prediction module 975 uses the reference MVs to create the predicted MVs. The predicted MVs can be computed by spatial MV prediction or temporal MV prediction. The difference between the predicted MVs and the motion compensation MVs (MC MVs) of the current frame (residual motion data) are encoded into the bitstream 995 by the entropy encoder 990.

The entropy encoder 990 encodes various parameters and data into the bitstream 995 by using entropy-coding techniques such as context-adaptive binary arithmetic coding (CABAC) or Huffman encoding. The entropy encoder 990 encodes various header elements, flags, along with the quantized transform coefficients 912, and the residual motion data as syntax elements into the bitstream 995. The bitstream 995 is in turn stored in a storage device or transmitted to a decoder over a communications medium such as a network.

The in-loop filter 945 performs filtering or smoothing operations on the reconstructed pixel data 917 to reduce the artifacts of coding, particularly at boundaries of pixel blocks. In some embodiments, the filtering or smoothing operations performed by the in-loop filter 945 include deblock filter (DBF), sample adaptive offset (SAO), and/or adaptive loop filter (ALF).

Figure 10:
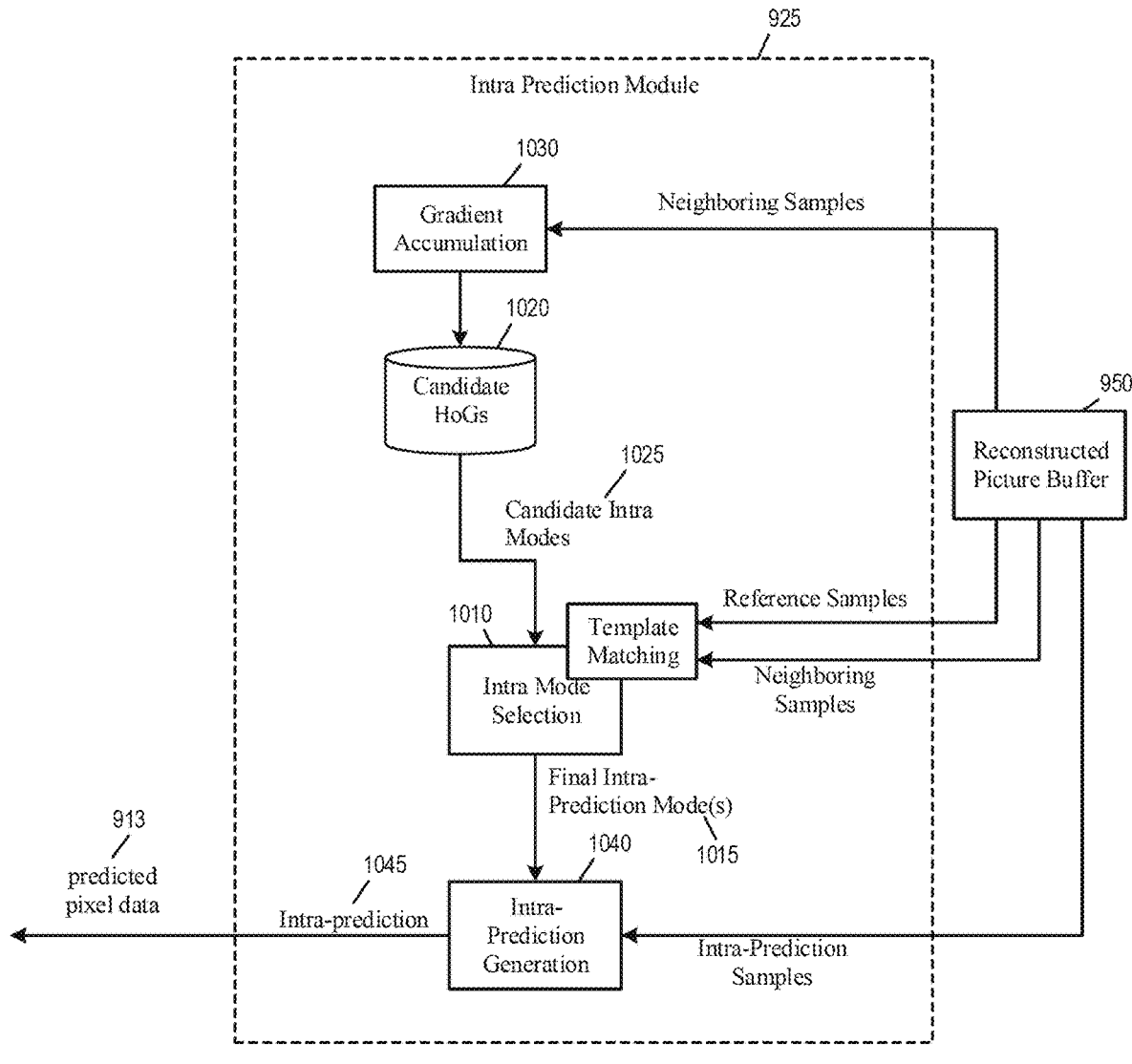
FIG. 10 illustrates portions of the video encoder that implement DIMD based on multiple HoGs.

FIG. 10 illustrates portions of the video encoder 900 that implement DIMD based on multiple HoGs. Specifically, the figure illustrates the components of the intra-prediction module 925 of the video encoder 900. As illustrated, the intra-prediction module 925 includes a gradient calculation module 1030, a candidate HoG storage 1020, an intra mode selection module 1010, and an intra-prediction generation module 1040. The intra-prediction module 925 may use these modules to perform DIMD intra-prediction for both luma and chroma components.

The gradient accumulation module 1030 receives neighboring samples of the current block from the reconstructed picture buffer 950 and computes gradient amplitudes for different intra mode directions. The gradient amplitudes are generated and accumulated for different HoGs in the candidate HoG storage 1020. The different HoGs are based on different subsets of the neighboring samples, and/or different numbers of neighboring lines. In some embodiments, each HoG is associated with a HoG generation index, which identifies the neighboring lines used to derive the HoG.

The intra mode selection module 1010 examines candidate intra modes 1025 from the different HoGs stored in the candidate HoG storage 1020. The intra mode selection module 1010 may identify a set of intra modes with the highest accumulation amplitudes from each HoG. The intra mode selection module 1010 then computes template matching (TM) cost for those identified intra modes. The TM costs are computed based on reference samples (in an L-shape reference region) and the neighboring samples of the current block provided by the reconstructed picture buffer 950. In some embodiments, the reference samples used for TM cost computation of a candidate intra mode are identified based on the HoG generation index of the HoG that provides the candidate intra mode. Based on the computed TM costs, intra mode selection module 1010 selects a HoG and a set of DIMD intra modes from the selected HoG as the final intra prediction mode(s) 1015.

The intra-prediction generation module 1040 uses the final intra prediction mode(s) 1015 to generate an intra-prediction 1045 for the current block. The final prediction mode(s) 1015 may include two or more DIMD intra modes, and the intra-prediction generation module 1040 may fetch multiple predictions/predictors from the reconstructed picture buffer 950 based on the multiple DIMD intra modes. The fetched multiple predictors are blended to generate the intra-prediction 1045 to be used as the predicted pixel data 913.

Figure 11:
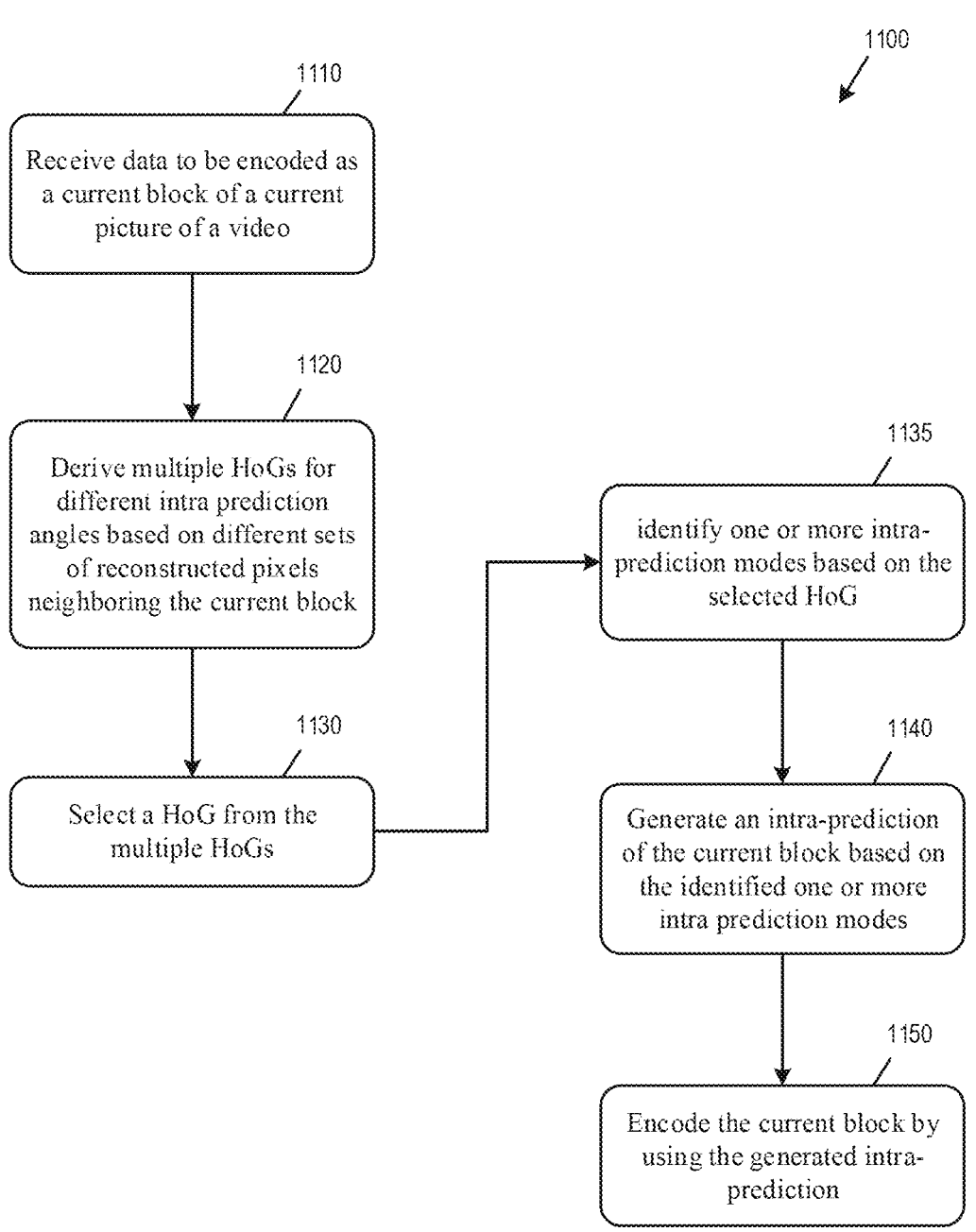
FIG. 11 conceptually illustrates a process that uses multiple HoGs to perform intra-prediction for the current block.

FIG. 11 conceptually illustrates a process 1100 that uses multiple HoGs to perform intra-prediction for the current block. In some embodiments, one or more processing units (e.g., a processor) of a computing device implementing the encoder 900 performs the process 1100 by executing instructions stored in a computer readable medium. In some embodiments, an electronic apparatus implementing the encoder 900 performs the process 1100.

The encoder receives (at block 1110) data to be encoded as a current block of pixels in a current picture of a video.

The encoder derives (at block 1120) a plurality of histograms of gradients (HoGs) for different intra prediction angles. The different HoGs are derived based on different sets of reconstructed pixels neighboring the current block. In some embodiments, a first HoG is derived based on reconstructed pixels above the current block, a second HoG derived based on reconstructed pixels left of the current block, and a third HoG derived based on reconstructed pixels left and above the current block. In some embodiments, the plurality of HoGs comprises HoGs that are derived using different numbers of neighboring lines of the current block.

The encoder selects (at block 1130) a HoG from the plurality of HoGs. The encoder identifies (at block 1135) one or more intra-prediction modes based on the selected HoG. In some embodiments, the selection of the HoG is based on a syntax element signaled in a bitstream. In some embodiments, the encoder identifies one or more intra-prediction modes from a HoG by identifying N candidate intra-prediction modes having the highest amplitudes in the HoG then selecting M intra-prediction modes from the N candidate intra-prediction modes based on costs. In some embodiments, reconstructed pixels at top-left corner of the current block are not used to derive the third HoG.

In some embodiments, the encoder computes costs of the intra-prediction modes that are identified based on the plurality of HoGs and selects the HoG from the plurality of HoGs based on the computed costs. In some embodiments, the cost of an intra-prediction mode is a TM cost computed by comparing a difference between reconstructed samples of a template neighboring the current block and prediction samples of the template generated by the intra-prediction mode using an L-shaped reference region near the template.

The encoder generates (at block 1140) an intra-prediction of the current block based on one or more intra prediction modes that are identified based on the selected HoG. In some embodiments, the plurality of HoGs comprise HoGs that are derived based on different neighboring lines of the current block, the different neighboring lines being associated with different HoG generation indices. In some embodiments, if a HoG derived based on neighboring lines associated with a first HoG generation index is used to derive a first intra prediction mode, then an intra-prediction of the current block based on the first intra prediction mode is generated based on a L-shaped reference region that is identified based on the first HoG generation index.

The encoder encodes (at block 1150) the current block by using the generated intra-prediction to produce prediction residuals.

VI. Example Video Decoder

In some embodiments, an encoder may signal (or generate) one or more syntax element in a bitstream, such that a decoder may parse said one or more syntax element from the bitstream.

Figure 12:
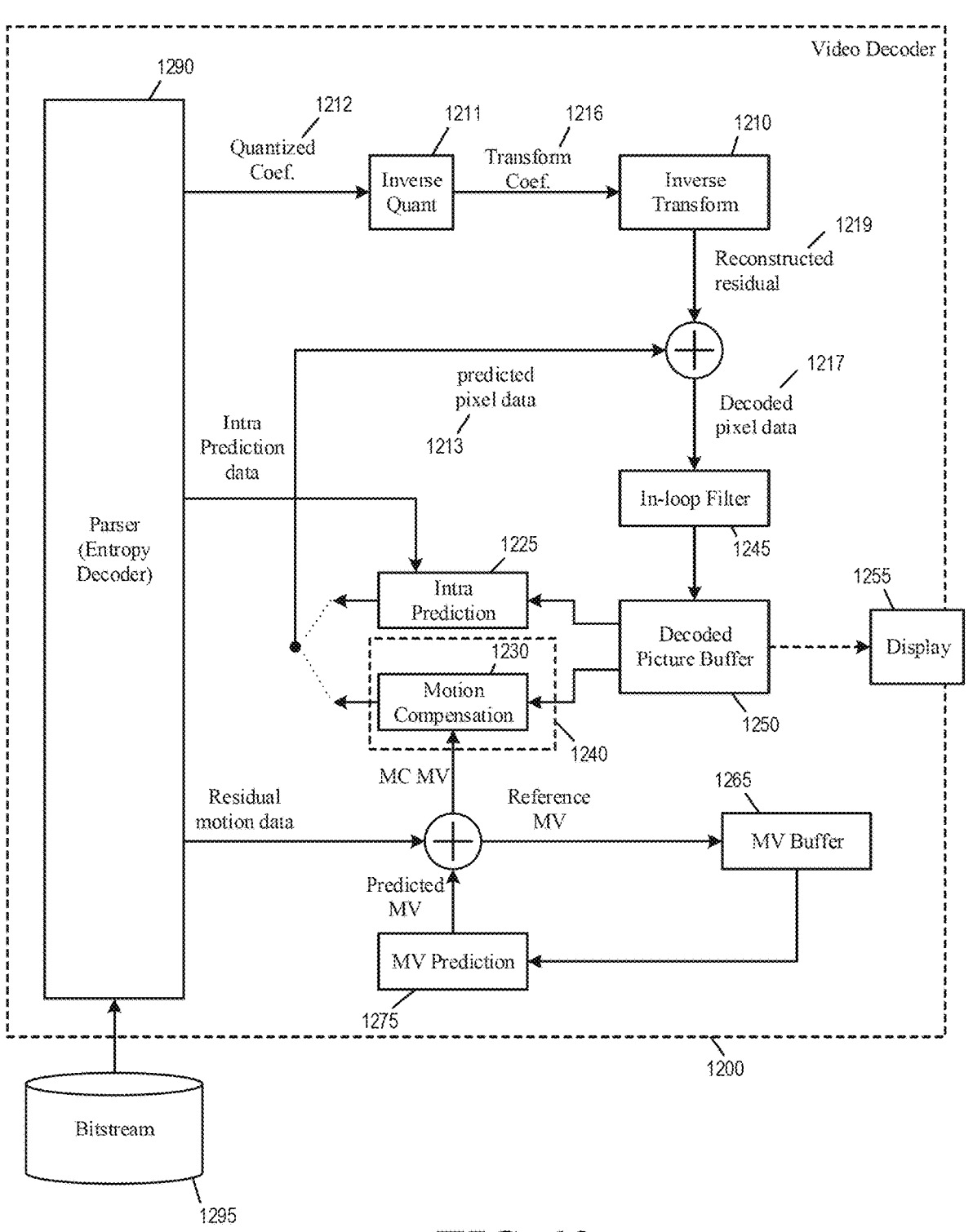
FIG. 12 illustrates an example video decoder that may implement DIMD intra prediction.

FIG. 12 illustrates an example video decoder 1200 that may implement decoder-side intra mode derivation (DIMD).

As illustrated, the video decoder 1200 is an image-decoding or video-decoding circuit that receives a bitstream 1295 and decodes the content of the bitstream into pixel data of video frames for display. The video decoder 1200 has several components or modules for decoding the bitstream 1295, including some components selected from an inverse quantization module 1211, an inverse transform module 1210, an intra-prediction module 1225, a motion compensation module 1230, an in-loop filter 1245, a decoded picture buffer 1250, a MV buffer 1265, a MV prediction module 1275, and a parser 1290. The motion compensation module 1230 is part of an inter-prediction module 1240.

In some embodiments, the modules 1210-1290 are modules of software instructions being executed by one or more processing units (e.g., a processor) of a computing device. In some embodiments, the modules 1210-1290 are modules of hardware circuits implemented by one or more ICs of an electronic apparatus. Though the modules 1210-1290 are illustrated as being separate modules, some of the modules can be combined into a single module.

The parser 1290 (or entropy decoder) receives the bitstream 1295 and performs initial parsing according to the syntax defined by a video-coding or image-coding standard. The parsed syntax element includes various header elements, flags, as well as quantized data (or quantized coefficients) 1212. The parser 1290 parses out the various syntax elements by using entropy-coding techniques such as context-adaptive binary arithmetic coding (CABAC) or Huffman encoding.

The inverse quantization module 1211 de-quantizes the quantized data (or quantized coefficients) 1212 to obtain transform coefficients, and the inverse transform module 1210 performs inverse transform on the transform coefficients 1216 to produce reconstructed residual signal 1219. The reconstructed residual signal 1219 is added with predicted pixel data 1213 from the intra-prediction module 1225 or the motion compensation module 1230 to produce decoded pixel data 1217. The decoded pixels data are filtered by the in-loop filter 1245 and stored in the decoded picture buffer 1250. In some embodiments, the decoded picture buffer 1250 is a storage external to the video decoder 1200. In some embodiments, the decoded picture buffer 1250 is a storage internal to the video decoder 1200.

The intra-prediction module 1225 receives intra-prediction data from bitstream 1295 and according to which, produces the predicted pixel data 1213 from the decoded pixel data 1217 stored in the decoded picture buffer 1250. In some embodiments, the decoded pixel data 1217 is also stored in a line buffer (not illustrated) for intra-picture prediction and spatial MV prediction.

In some embodiments, the content of the decoded picture buffer 1250 is used for display. A display device 1255 either retrieves the content of the decoded picture buffer 1250 for display directly, or retrieves the content of the decoded picture buffer to a display buffer. In some embodiments, the display device receives pixel values from the decoded picture buffer 1250 through a pixel transport.

The motion compensation module 1230 produces predicted pixel data 1213 from the decoded pixel data 1217 stored in the decoded picture buffer 1250 according to motion compensation MVs (MC MVs). These motion compensation MVs are decoded by adding the residual motion data received from the bitstream 1295 with predicted MVs received from the MV prediction module 1275.

The MV prediction module 1275 generates the predicted MVs based on reference MVs that were generated for decoding previous video frames, e.g., the motion compensation MVs that were used to perform motion compensation. The MV prediction module 1275 retrieves the reference MVs of previous video frames from the MV buffer 1265. The video decoder 1200 stores the motion compensation MVs generated for decoding the current video frame in the MV buffer 1265 as reference MVs for producing predicted MVs.

The in-loop filter 1245 performs filtering or smoothing operations on the decoded pixel data 1217 to reduce the artifacts of coding, particularly at boundaries of pixel blocks. In some embodiments, the filtering or smoothing operations performed by the in-loop filter 1245 include deblock filter (DBF), sample adaptive offset (SAO), and/or adaptive loop filter (ALF).

Figure 13:
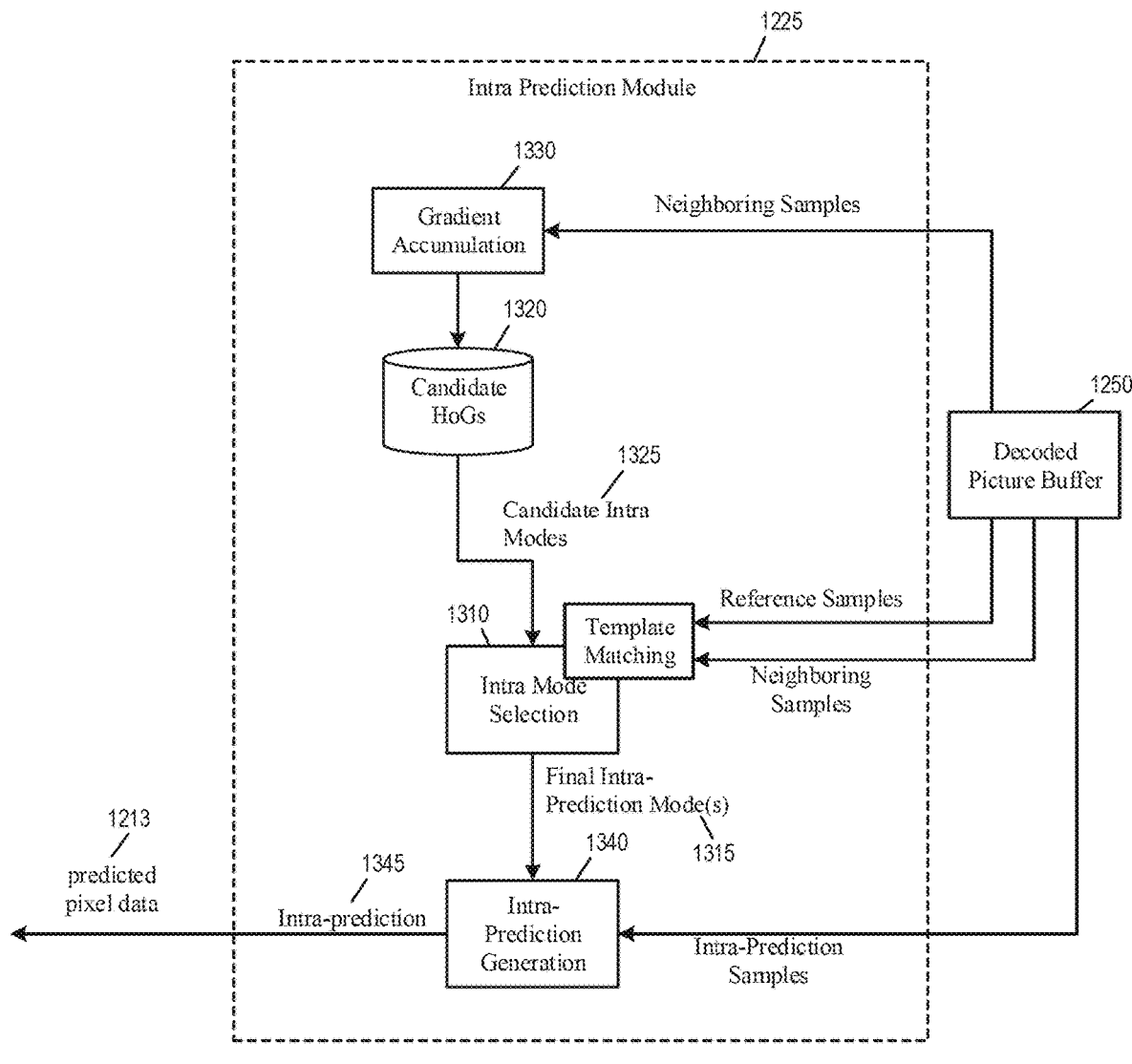
FIG. 13 illustrates portions of the video decoder that implement DIMD based on multiple HoGs.

FIG. 13 illustrates portions of the video decoder 1200 that implement DIMD based on multiple HoGs. Specifically, the figure illustrates the components of the intra-prediction module 1225 of the video decoder 1200. As illustrated, the intra-prediction module 1225 includes a gradient calculation module 1330, a candidate HoG storage 1320, an intra mode selection module 1310, and an intra-prediction generation module 1340. The intra-prediction module 1225 may use these modules to perform DIMD intra-prediction for both luma and chroma components.

The gradient accumulation module 1330 receives reconstructed neighboring samples of the current block from the decoded picture buffer 1250 and computes gradient amplitudes for different intra mode directions. The gradient amplitudes are generated and accumulated for different HoGs in the candidate HoG storage 1320. The different HoGs are based on different subsets of the neighboring samples, and/or different numbers of neighboring lines. In some embodiments, each HoG is associated with a HoG generation index, which identifies the neighboring lines used to derive the HoG.

The intra mode selection module 1310 examines candidate intra modes 1325 from the different HoGs stored in the candidate HoG storage 1320. The intra mode selection module 1310 may identify a set of intra modes with the highest accumulation amplitudes from each HoG. The intra mode selection module 1310 then computes template matching (TM) cost for those identified intra modes. The TM costs are computed based on reference samples (in an L-shape reference region) and the neighboring samples of the current block provided by the decoded picture buffer 1250. In some embodiments, the reference samples used for TM cost computation of a candidate intra mode are identified based on the HoG generation index of the HoG that provides the candidate intra mode. Based on the computed TM costs, intra mode selection module 1310 selects a HoG and a set of DIMD intra modes from the selected HoG as the final intra prediction mode(s) 1315.

The intra-prediction generation module 1340 uses the final intra prediction mode(s) 1315 to generate an intra-prediction 1345 for the current block. The final prediction mode(s) 1315 may include two or more DIMD intra modes, and the intra-prediction generation module 1340 may fetch multiple predictions/predictors from the decoded picture buffer 1250 based on the multiple DIMD intra modes. The fetched multiple predictors are blended to generate the intra-prediction 1345 to be used as the predicted pixel data 1213.

Figure 14:
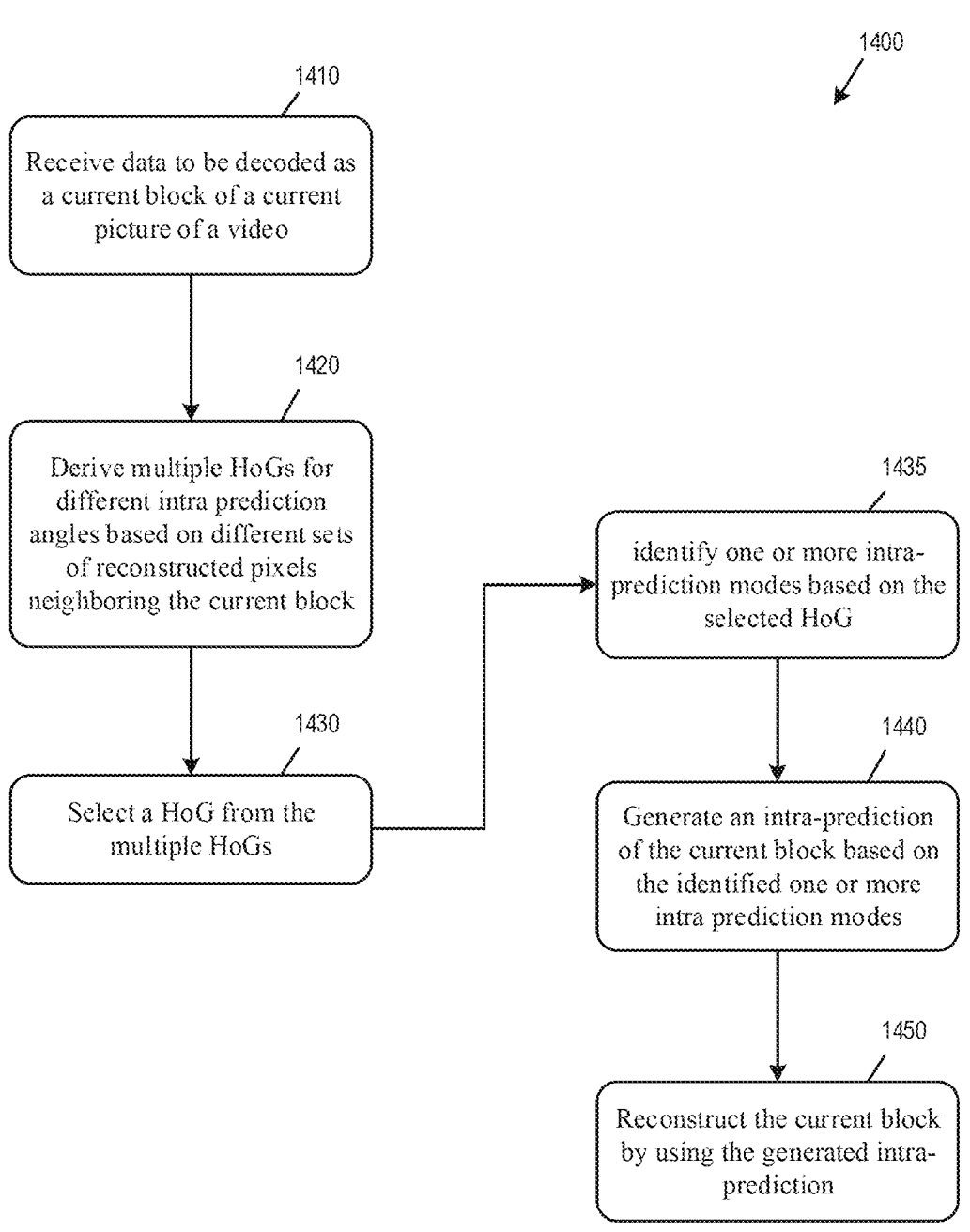
FIG. 14 conceptually illustrates a process that uses multiple HoGs to perform intra-prediction for the current block.

FIG. 14 conceptually illustrates a process 1400 that uses multiple HoGs to perform intra-prediction for the current block. In some embodiments, one or more processing units (e.g., a processor) of a computing device implementing the decoder 900 performs the process 1400 by executing instructions stored in a computer readable medium. In some embodiments, an electronic apparatus implementing the decoder 900 performs the process 1400.

The decoder receives (at block 1410) data to be decoded as a current block of pixels in a current picture of a video.

The decoder derives (at block 1420) a plurality of histograms of gradients (HoGs) for different intra prediction angles. The different HoGs are derived based on different sets of reconstructed pixels neighboring the current block. In some embodiments, a first HoG is derived based on reconstructed pixels above the current block, a second HoG derived based on reconstructed pixels left of the current block, and a third HoG derived based on reconstructed pixels left and above the current block. In some embodiments, the plurality of HoGs comprises HoGs that are derived using different numbers of neighboring lines of the current block.

The decoder selects (at block 1430) a HoG from the plurality of HoGs. The decoder identifies (at block 1435) one or more intra-prediction modes based on the selected HoG. In some embodiments, the selection of the HoG is based on a syntax element signaled in a bitstream. In some embodiments, the decoder identifies one or more intra-prediction modes from a HoG by identifying N candidate intra-prediction modes having the highest amplitudes in the HoG then selecting M intra-prediction modes from the N candidate intra-prediction modes based on costs. In some embodiments, reconstructed pixels at top-left corner of the current block are not used to derive the third HoG.

In some embodiments, the decoder computes costs of the intra-prediction modes that are identified based on the plurality of HoGs and selects the HoG from the plurality of HoGs based on the computed costs. In some embodiments, the cost of an intra-prediction mode is a TM cost computed by comparing a difference between reconstructed samples of a template neighboring the current block and prediction samples of the template generated by the intra-prediction mode using an L-shaped reference region near the template.

The decoder generates (at block 1440) an intra-prediction of the current block based on one or more intra prediction modes that are identified based on the selected HoG. In some embodiments, the plurality of HoGs comprise HoGs that are derived based on different neighboring lines of the current block, the different neighboring lines being associated with different HoG generation indices. In some embodiments, if a HoG derived based on neighboring lines associated with a first HoG generation index is used to derive a first intra prediction mode, then an intra-prediction of the current block based on the first intra prediction mode is generated based on a L-shaped reference region that is identified based on the first HoG generation index.

The decoder reconstructs (at block 1450) the current block by using the generated intra-prediction. The decoder may then provide the reconstructed current block for display as part of the reconstructed current picture.

VII. Example Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random-access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the present disclosure. In some embodiments, the software programs, when installed to operate on one or more electronic systems, define one or more specific machine implementations that execute and perform the operations of the software programs.

Figure 15:
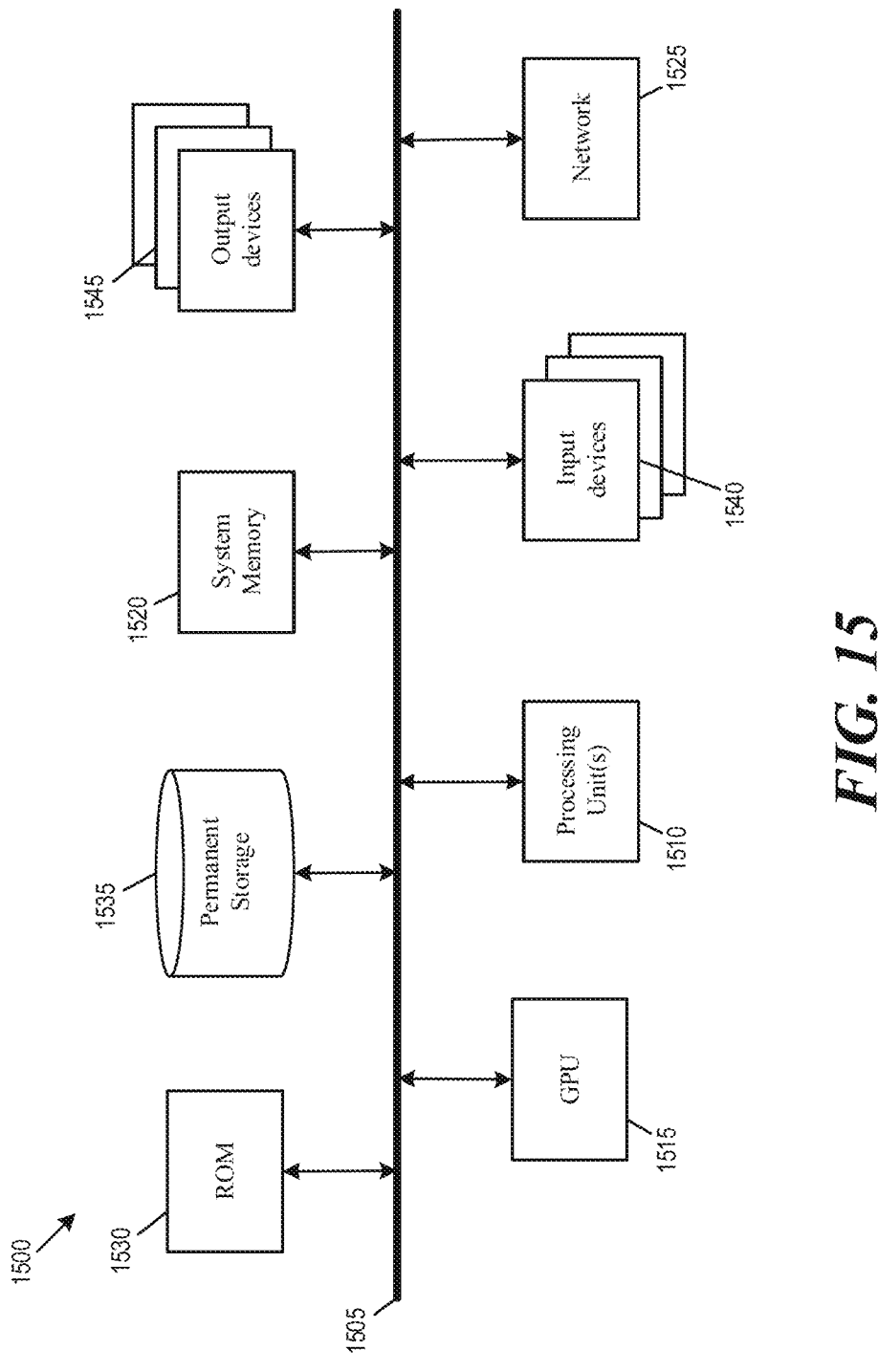
FIG. 15 conceptually illustrates an electronic system with which some embodiments of the present disclosure are implemented.

FIG. 15 conceptually illustrates an electronic system 1500 with which some embodiments of the present disclosure are implemented. The electronic system 1500 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 1500 includes a bus 1505, processing unit(s) 1510, a graphics-processing unit (GPU) 1515, a system memory 1520, a network 1525, a read-only memory 1530, a permanent storage device 1535, input devices 1540, and output devices 1545.

The bus 1505 collectively represents all system, peripheral, and chipset buses that communicatively connect the numerous internal devices of the electronic system 1500. For instance, the bus 1505 communicatively connects the processing unit(s) 1510 with the GPU 1515, the read-only memory 1530, the system memory 1520, and the permanent storage device 1535.

From these various memory units, the processing unit(s) 1510 retrieves instructions to execute and data to process in order to execute the processes of the present disclosure. The processing unit(s) may be a single processor or a multi-core processor in different embodiments. Some instructions are passed to and executed by the GPU 1515. The GPU 1515 can offload various computations or complement the image processing provided by the processing unit(s) 1510.

The read-only-memory (ROM) 1530 stores static data and instructions that are used by the processing unit(s) 1510 and other modules of the electronic system. The permanent storage device 1535, on the other hand, is a read-and-write memory device. This device is a non-volatile memory unit that stores instructions and data even when the electronic system 1500 is off. Some embodiments of the present disclosure use a mass-storage device (such as a magnetic or optical disk and its corresponding disk drive) as the permanent storage device 1535.

Other embodiments use a removable storage device (such as a floppy disk, flash memory device, etc., and its corresponding disk drive) as the permanent storage device. Like the permanent storage device 1535, the system memory 1520 is a read-and-write memory device. However, unlike storage device 1535, the system memory 1520 is a volatile read-and-write memory, such a random access memory. The system memory 1520 stores some of the instructions and data that the processor uses at runtime. In some embodiments, processes in accordance with the present disclosure are stored in the system memory 1520, the permanent storage device 1535, and/or the read-only memory 1530. For example, the various memory units include instructions for processing multimedia clips in accordance with some embodiments. From these various memory units, the processing unit(s) 1510 retrieves instructions to execute and data to process in order to execute the processes of some embodiments.

The bus 1505 also connects to the input and output devices 1540 and 1545. The input devices 1540 enable the user to communicate information and select commands to the electronic system. The input devices 1540 include alpha-numeric keyboards and pointing devices (also called "cursor control devices"), cameras (e.g., webcams), microphones or similar devices for receiving voice commands, etc. The output devices 1545 display images generated by the electronic system or otherwise output data. The output devices 1545 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 15, bus 1505 also couples electronic system 1500 to a network 1525 through a network adapter (not shown). In this manner, the computer can be a part of a network of computers (such as a local area network ("LAN"), a wide area network ("WAN"), or an Intranet, or a network of networks, such as the Internet. Any or all components of electronic system 1500 may be used in conjunction with the present disclosure.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, many of the above-described features and applications are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the present disclosure has been described with reference to numerous specific details, one of ordinary skill in the art will recognize that the present disclosure can be embodied in other specific forms without departing from the spirit of the present disclosure. In addition, a number of the figures (including FIG. 11 and FIG. 14) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the present disclosure is not to be limited by the foregoing illustrative details, but rather is to be defined by the appended claims.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A video coding method comprising:
   receiving data to be encoded or decoded as a current block of a current picture of a video;
   deriving a plurality of histograms of gradients (HoGs) for different intra prediction angles, wherein different HoGs are derived based on different sets of reconstructed pixels neighboring the current block;
   selecting a HoG from the plurality of HoGs;
   identifying one or more intra prediction modes based on the selected HoG;
   generating an intra-prediction of the current block based on the identified one or more intra prediction modes; and encoding or decoding the current block by using the generated intra-prediction.

2. The video coding method of claim 1, wherein each of the plurality of HoGs is used to identify a different set of one or more intra-prediction modes.

3. The video coding method of claim 2, further comprising:

computing costs of the intra-prediction modes that are identified based on the plurality of HoGs, wherein the selected HoG is selected from the plurality of HoGs based on the computed costs.

4. The video coding method of claim 3, wherein the cost of an intra-prediction mode is computed by comparing a difference between reconstructed samples of a template neighboring the current block and prediction samples of the template generated by the intra-prediction mode using an L-shaped reference region near the template.

5. The video coding method of claim 2, further comprising:

identifying N candidate intra-prediction modes from a HoG having the highest amplitudes in the HoG;

computing a cost for each of the N candidate intra-prediction modes;

selecting M intra-prediction modes from the N candidate intra-prediction modes based on the computed costs as the intra-prediction modes that are identified based on the HoG.

6. The video coding method of claim 1, wherein the plurality of HoGs comprises:

a first HoG derived based on reconstructed pixels above the current block;

a second HoG derived based on reconstructed pixels left of the current block; and a third HoG derived based on reconstructed pixels left and above the current block.

7. The video coding method of claim 6, wherein reconstructed pixels at top-left corner of the current block are not used to derive the third HoG.

8. The video coding method of claim 1, wherein the plurality of HoGs comprises HoGs that are derived using different numbers of neighboring lines of the current block.

9. The video coding method of claim 1, wherein the plurality of HoGs comprise HoGs that are derived based on different neighboring lines of the current block, the different neighboring lines being associated with different HoG generation indices, wherein a first HoG derived based on neighboring lines associated with a first HoG generation index is used to derive a first intra prediction mode, wherein an intra-prediction of the current block based on the first intra prediction mode is generated based on a L-shaped reference region that is identified based on the first HoG generation index.

10. The video coding method of claim 1, wherein the selection of the HoG is based on a syntax element signaled in a bitstream.

11. An electronic apparatus comprising:

a video coder circuit configured to perform operations comprising:

receiving data to be encoded or decoded as a current block of a current picture of a video;

deriving a plurality of histograms of gradients (HoGs) for different intra prediction angles, wherein different HoGs are derived based on different sets of reconstructed pixels neighboring the current block;

selecting a HoG from the plurality of HoGs;

identifying one or more intra prediction modes based on the selected HoG;

generating an intra-prediction of the current block based on the identified one or more intra prediction modes; and encoding or decoding the current block by using the generated intra-prediction.

12. A video decoding method comprising:

receiving data to be decoded as a current block of a current picture of a video;

deriving a plurality of histograms of gradients (HoGs) for different intra prediction angles, wherein different HoGs are derived based on different sets of reconstructed pixels neighboring the current block;

selecting a HoG from the plurality of HoGs;

identifying one or more intra prediction modes based on the selected HoG;

generating an intra-prediction of the current block based on the identified one or more intra prediction modes; and reconstructing the current block by using the generated intra-prediction.

13. A video encoding method comprising:

receiving data to be encoded as a current block of a current picture of a video into a bitstream;

deriving a plurality of histograms of gradients (HoGs) for different intra prediction angles, wherein different HoGs are derived based on different sets of reconstructed pixels neighboring the current block;

selecting a HoG from the plurality of HoGs;

identifying one or more intra prediction modes based on the selected HoG;

generating an intra-prediction of the current block based on the identified one or more intra prediction modes; and encoding the current block by using the generated intra-prediction to produce prediction residuals.

* * * * *